US011204014B2

(12) United States Patent
Fouquet et al.

(10) Patent No.: US 11,204,014 B2
(45) Date of Patent: Dec. 21, 2021

(54) COMPACT WAVE ENERGY CONVERTER

(71) Applicants: Julie E Fouquet, Portola Valley, CA (US); Milan Singh Minsky, Newton, MA (US); Michael James Prichard, Carlisle, MA (US); Lars Elof Rosenblad, Long Beach, CA (US)

(72) Inventors: Julie E Fouquet, Portola Valley, CA (US); Milan Singh Minsky, Newton, MA (US); Michael James Prichard, Carlisle, MA (US); Lars Elof Rosenblad, Long Beach, CA (US)

(73) Assignee: 3newable LLC, Portola Valley, CA (US)

( * ) Notice: Subject to any disclaimer, the term of this patent is extended or adjusted under 35 U.S.C. 154(b) by 0 days.

(21) Appl. No.: 16/806,099

(22) Filed: Mar. 2, 2020

(65) Prior Publication Data

US 2020/0284237 A1    Sep. 10, 2020

Related U.S. Application Data

(60) Provisional application No. 62/813,873, filed on Mar. 5, 2019.

(51) Int. Cl.
  *F03B 13/20*    (2006.01)
(52) U.S. Cl.
  CPC ................... *F03B 13/20* (2013.01)
(58) Field of Classification Search
  CPC ...... F03B 13/26; F03B 13/16; F03B 13/1885; F03B 13/20; F03B 15/00; F03B 2240/93; F05B 2260/4031; F05B 2220/706; F05B 2240/97; F05B 2280/5001; F05B 13/188; Y02E 10/38

See application file for complete search history.

(56) References Cited

U.S. PATENT DOCUMENTS

| 4,341,074 A * | 7/1982 | French | F03B 13/20 60/504 |
| 8,008,792 B2 * | 8/2011 | Gray | F03B 13/20 290/42 |
| 8,358,025 B2 * | 1/2013 | Hogmoe | F03B 13/20 290/53 |
| 8,581,432 B2 * | 11/2013 | Rohrer | F03B 13/1815 290/53 |
| 8,823,196 B1 * | 9/2014 | Gehring | F03B 13/1885 290/53 |
| 8,943,821 B2 * | 2/2015 | Hagemann | F03B 13/1825 60/505 |

(Continued)

*Primary Examiner* — Shafiq Mian
(74) *Attorney, Agent, or Firm* — Shalini Venkatesh

(57) ABSTRACT

A wave energy converter comprises a power generator, characterized by an axial length along a longitudinal axis; the power generator being configured to tilt about a horizontal axis perpendicular to the longitudinal axis. The tilt results in a conversion of kinetic energy, present in a group of water waves causing the tilt, to electrical energy. The axial length is less than approximately one quarter of the average wavelength expected to be encountered in a dominant subgroup of waves within the group of waves. The power generator generates power independent of whether or not the wave energy converter is tethered to any solid object at a position that is fixed independent of water motion.

20 Claims, 29 Drawing Sheets

(56) References Cited

U.S. PATENT DOCUMENTS

| | | | |
|---|---|---|---|
| 2010/0225116 A1* | 9/2010 | Cuong | F03B 13/20 290/53 |
| 2012/0248865 A1* | 10/2012 | Eder | F03B 13/16 307/9.1 |
| 2013/0067903 A1* | 3/2013 | Murtagh | F03B 13/20 60/505 |
| 2016/0258412 A1* | 9/2016 | Degrieck | F03B 13/18 |
| 2017/0047820 A1* | 2/2017 | Degriek | F03B 13/186 |

* cited by examiner

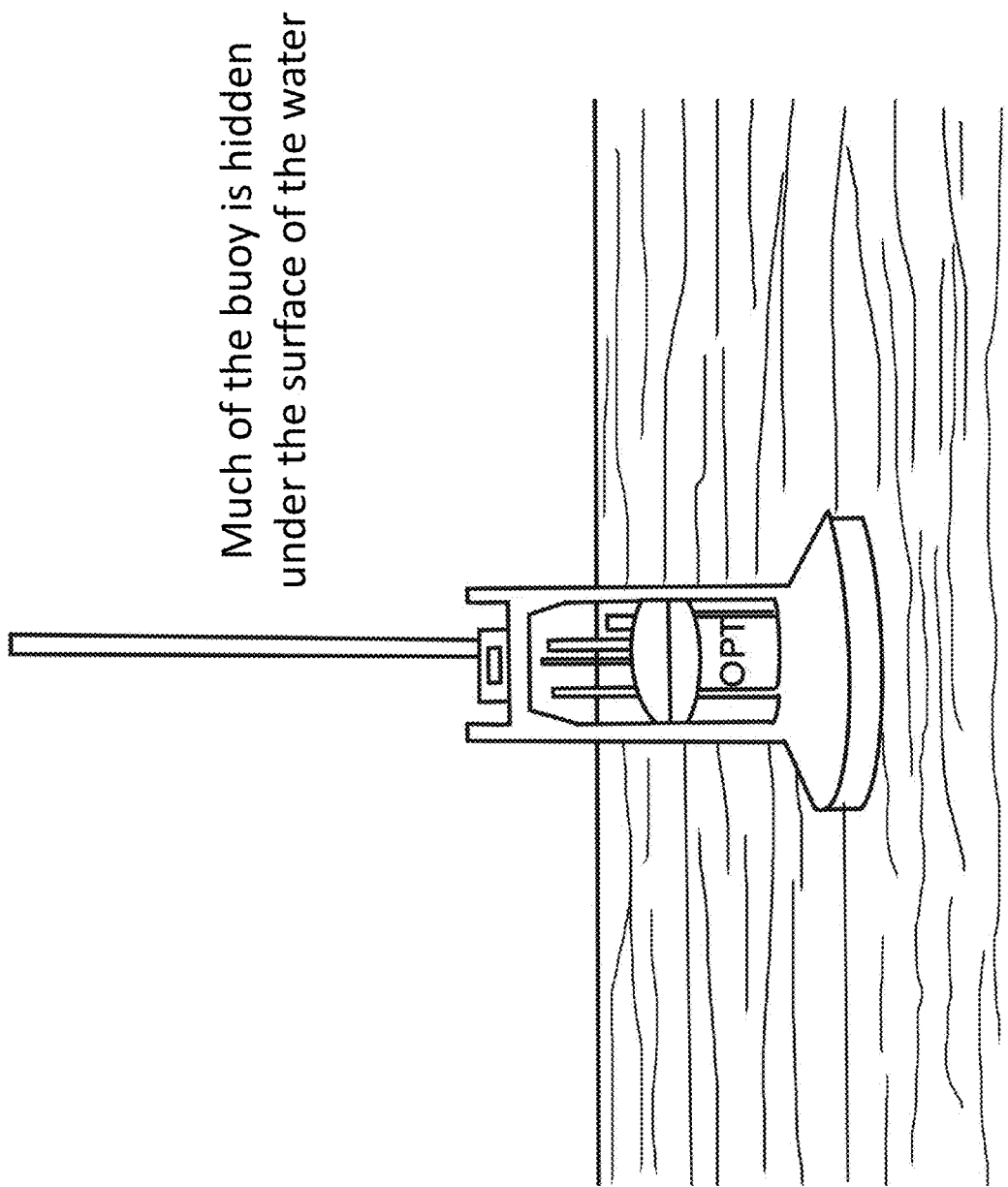
Figure 1A – Prior Art

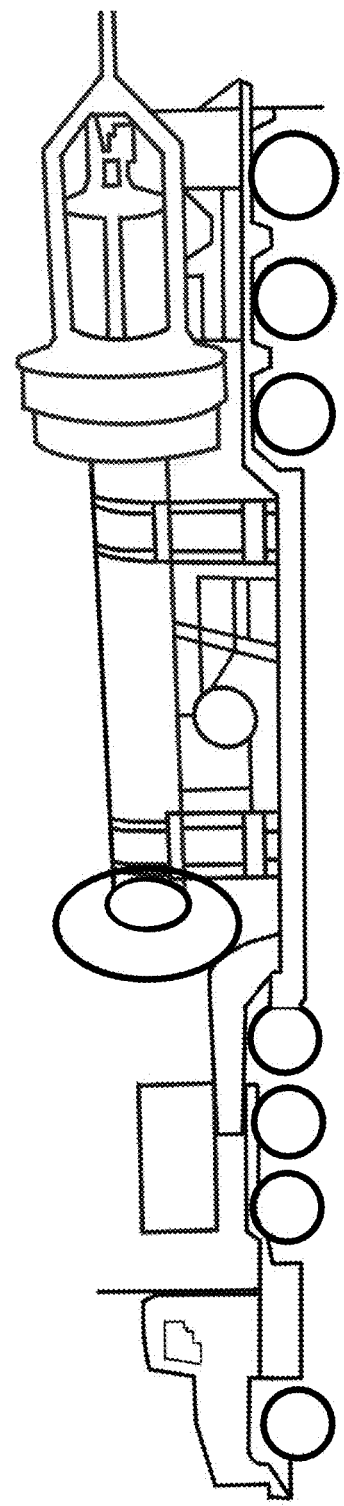
Figure 1 B – Prior Art

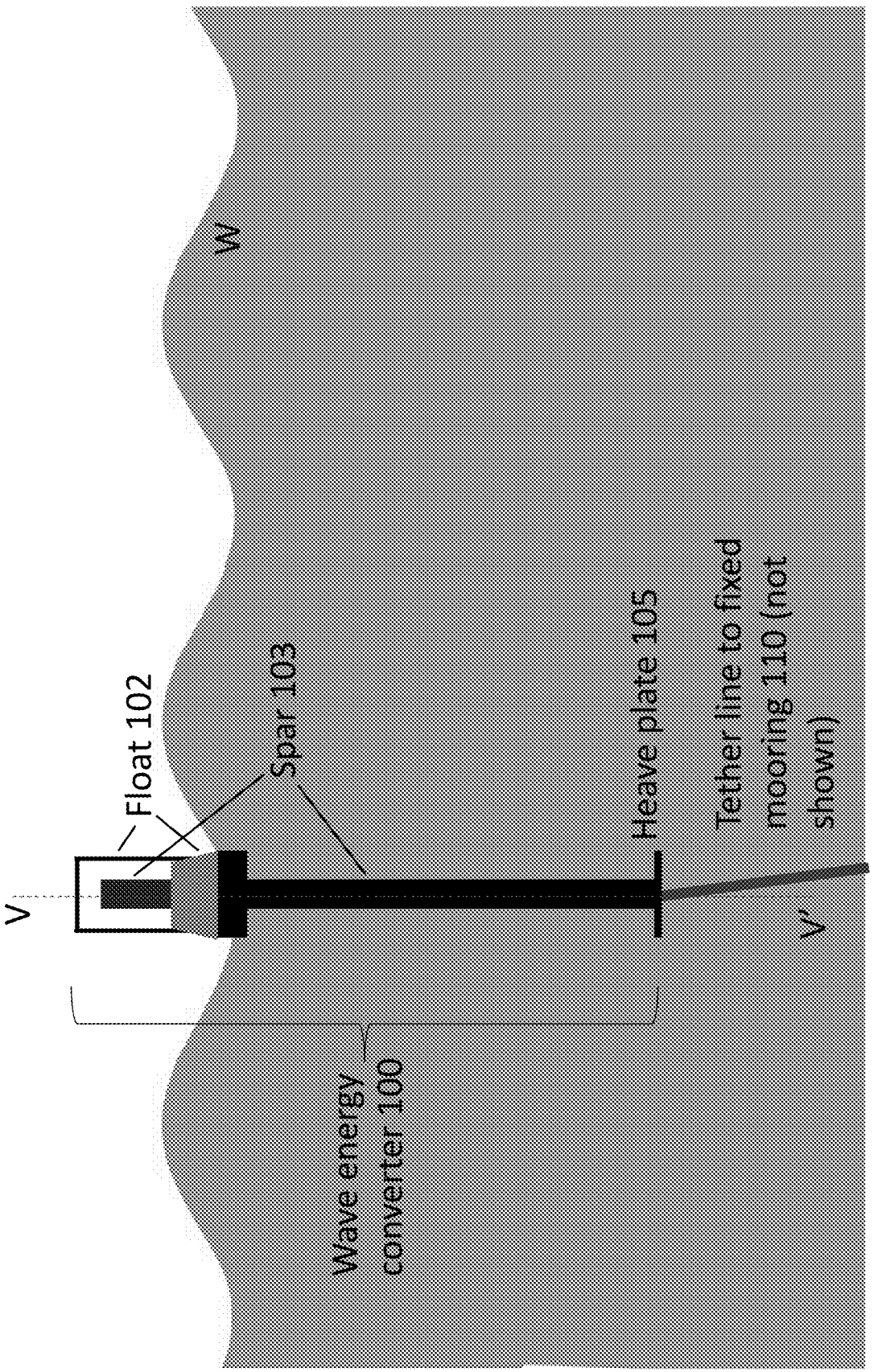
Figure 1C – Prior Art

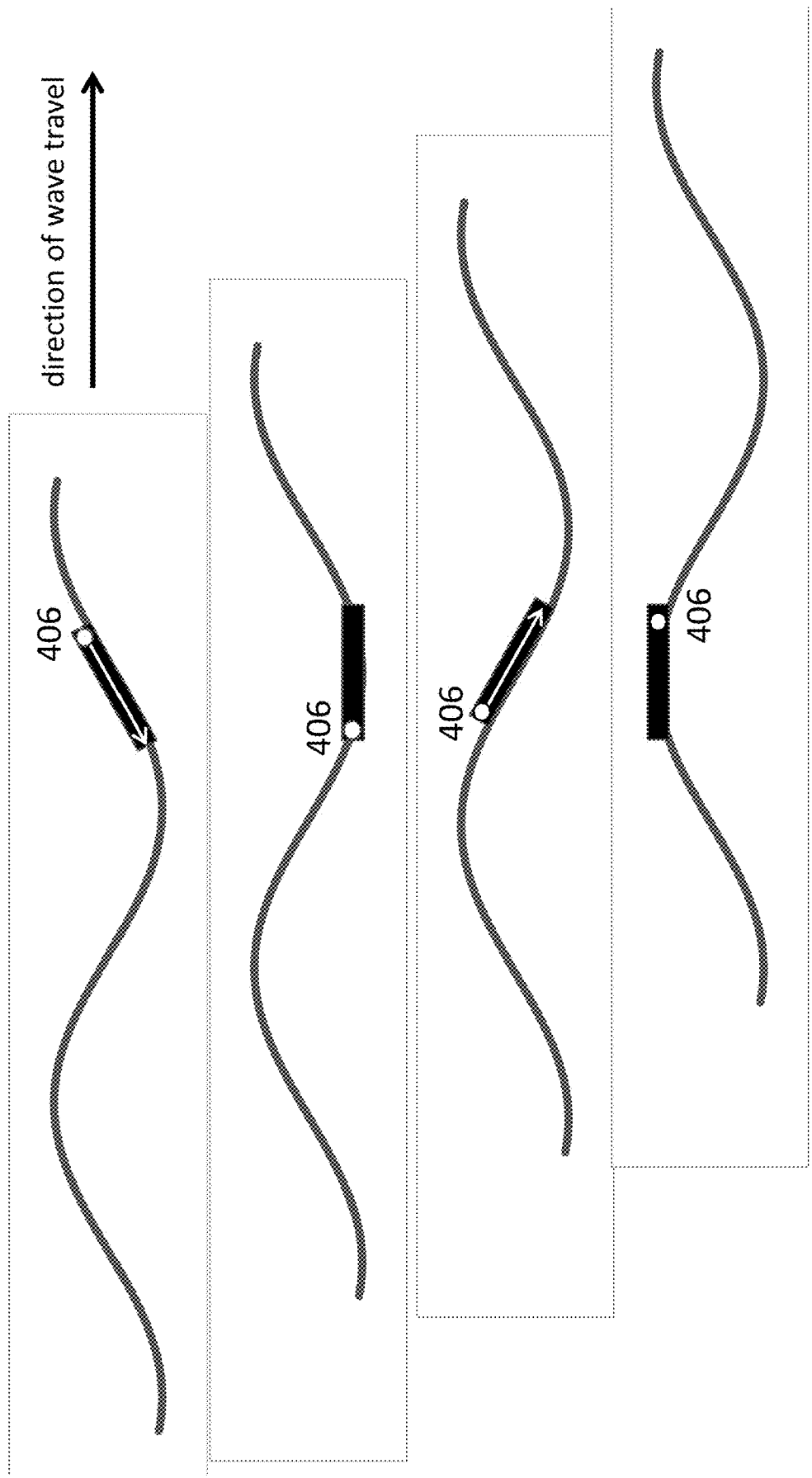

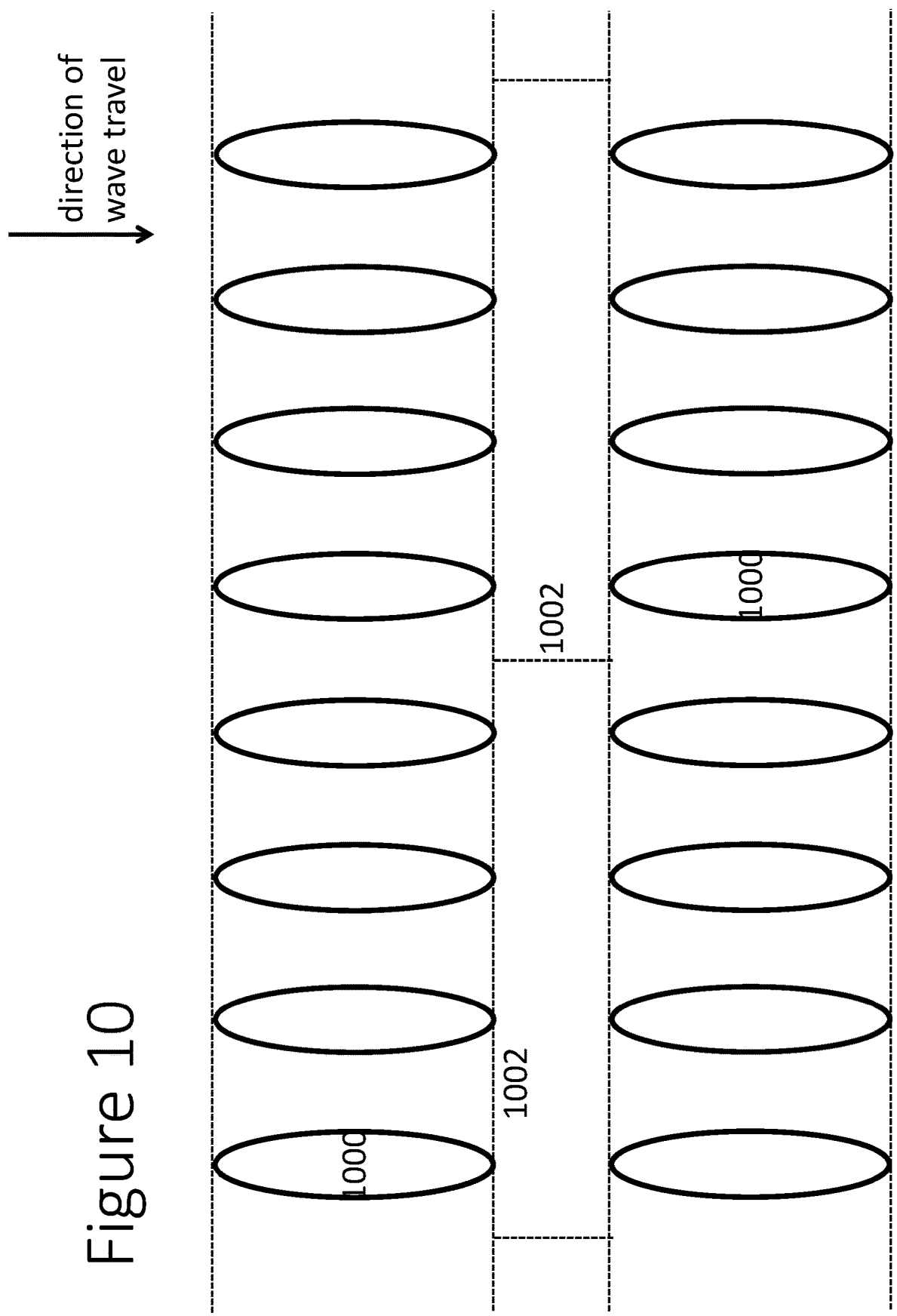

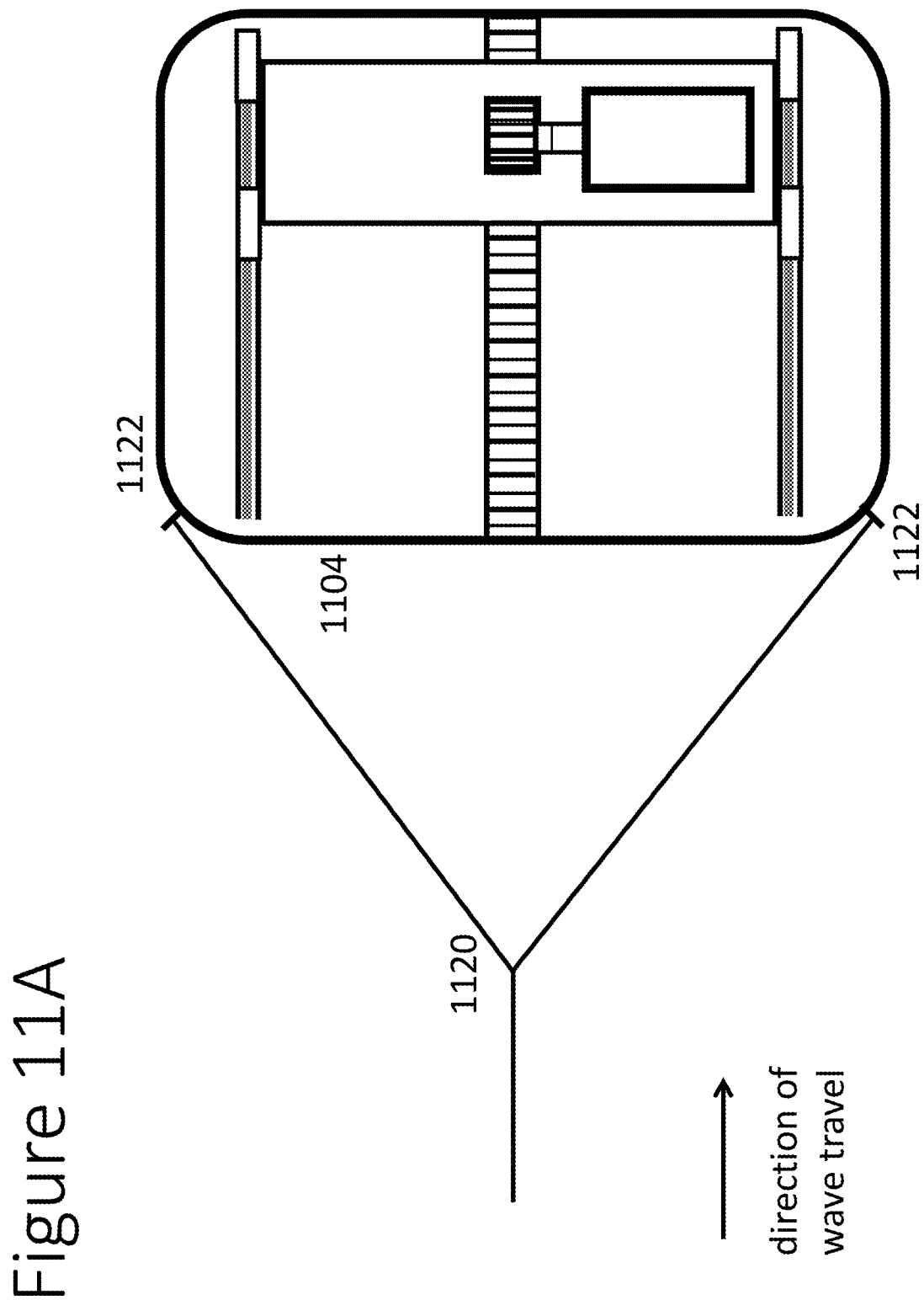

COMPACT WAVE ENERGY CONVERTER

CROSS REFERENCE TO RELATED APPLICATION

This application claims the benefit of U.S. Provisional Patent Application Ser. No. 62/813,873, filed on Mar. 5, 2019, which is hereby incorporated by reference as if set forth in full in this application for all purposes.

BACKGROUND

Ocean waves are an abundant, mostly untapped power source. The Electric Power Research Institute estimates that an energy of ~1,000 TW hours per year is available along US coasts. Even a small fraction of this amount could be a major source of renewable energy, reducing national reliance on imported and domestically produced fossil fuels, and reducing greenhouse gas emissions. Ocean waves are usually present at night when solar panels don't function. They are often also present when the air is relatively still so that wind turbines cannot operate Wave energy converters (WECs) are potentially a particularly attractive option for powering devices such as aids to navigation, communication buoys, sensor buoys, and sensor devices for aquaculture. The majority of the currently existing wave energy converters (WECs) are over 10 meters in size and require fixed moorings, the latter feature eliminating the possibility of using them to power drift buoys. In many cases, the moorings require the WECs to be positioned close to a shore, with potential resistance from local residents on the grounds of aesthetics, safety and/or convenience. Moreover, development cycles for prototypes of current WEC designs are long and expensive. These drawbacks have limited the widespread adoption of WECs.

There is, therefore, a need to develop a compact, relatively inexpensive WEC, that can not only deliver adequate power for fixed location applications, but can also operate without requiring a fixed mooring, to serve drift buoys, for example. Ideally, of course, such an improved WEC would also be characterized by high energy conversion efficiency, and easy-to-meet deployment, operational and maintenance requirements. Another desirable feature would be the ability to scale up to high powers in ocean environments where water waves with long wavelengths may be encountered.

SUMMARY

The present invention includes methods and structures that use the kinetic energy of moving water waves to generate electrical power. In one embodiment, a WEC comprises a power generator. The power generator, characterized by an axial length along a longitudinal axis, is configured to tilt about a horizontal axis perpendicular to the longitudinal axis, such that the tilt results in a conversion of kinetic energy, present in a group of water waves causing the tilt, to electrical energy. The axial length is less than approximately one quarter of the average wavelength expected to be encountered in a dominant sub-group of waves within the group of waves. The power generator generates power, independent of whether or not the WEC is tethered to any solid object at a position that is fixed independent of water motion.

In another embodiment, a power generation system comprises a plurality of interconnected WECs; wherein each WEC is characterized by an axial length along a longitudinal axis, the WEC being configured to tilt about a horizontal axis perpendicular to the longitudinal axis, such that the tilt results in a conversion of kinetic energy, present in a group of water waves causing the tilt, to electrical energy; wherein the axial length of each WEC is less than approximately one quarter of the average wavelength expected to be encountered in a dominant sub-group of waves within the group of waves; and wherein the power generation system generates power independent of whether or not any of the WECs is tethered to any solid object at a position that is fixed independent of water motion.

In another embodiment, a method of power generation comprises: deploying a WEC, characterized by an axial length along a longitudinal axis, on a top surface of a body of water; and operating the WEC to make use of tilt, imposed on the WEC by a group of waves moving through the body of water, to convert kinetic energy, present in the group of waves, to electrical energy. The axial length is less than approximately one quarter of the average wavelength expected to be encountered in a dominant sub-group of waves within the group of waves; and power is generated independent of whether or not the WEC is tethered to any solid object at a position that is fixed independent of water motion.

BRIEF DESCRIPTION OF THE DRAWINGS

FIGS. 1A, 1B, 1C (Prior Art) illustrate examples of commercially produced wave energy converters (WECs) at various stages of deployment.

FIG. 4 illustrates how embodiments of the present invention may operate on moving waves.

FIG. 10 shows a wave energy converter system according to one embodiment of the present invention.

FIGS. 11A and 11B illustrate top and end views of a WEC according to another embodiment of the present invention.

DETAILED DESCRIPTION OF EMBODIMENTS

Figure 2A:
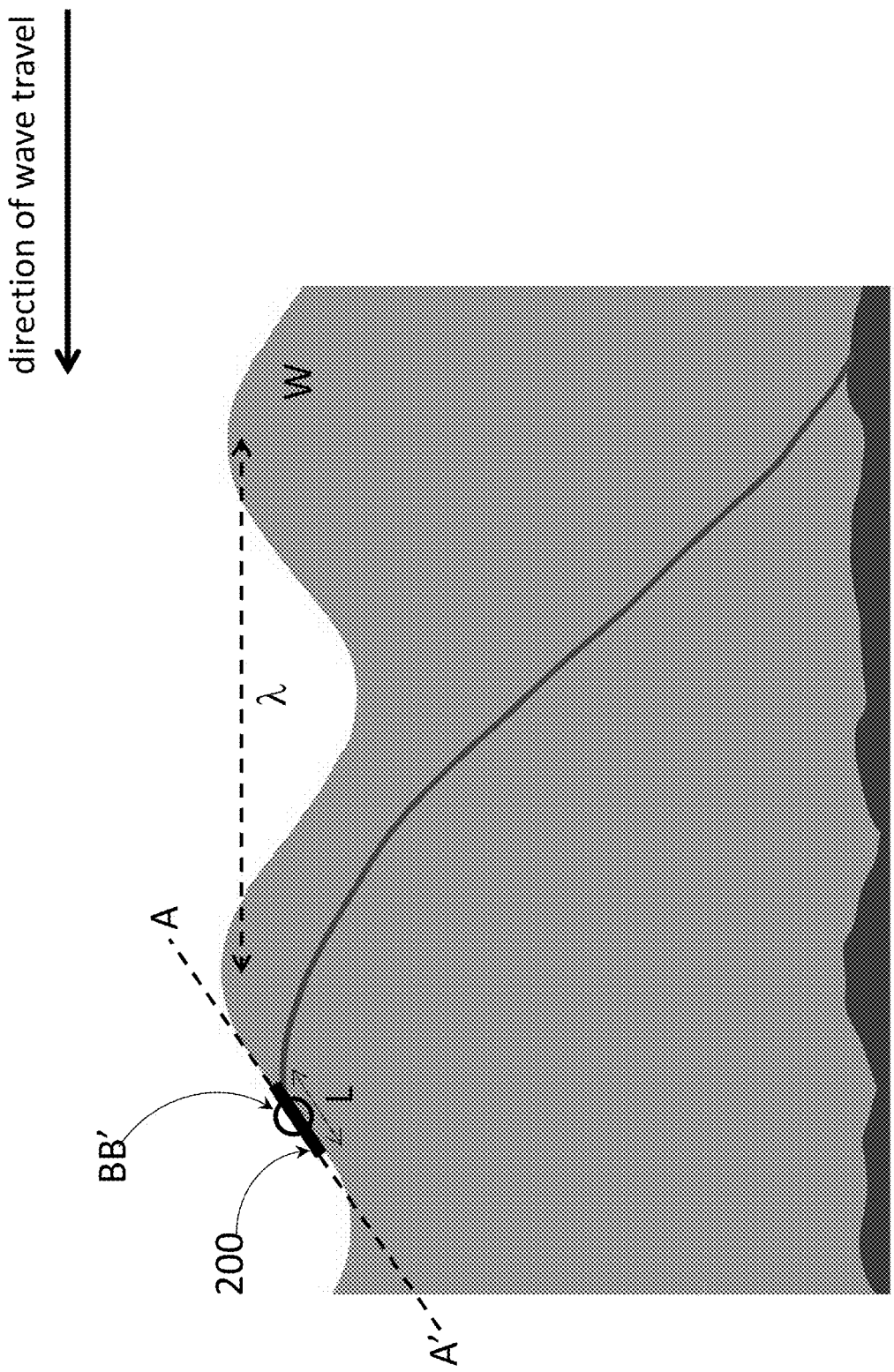
FIGS. 2A, 2B, 2C, 2D, 2E, 2F illustrate a WEC according to one embodiment of the present invention, in various deployment scenarios.

The manner in which the present invention provides its advantages can be more easily understood with reference to FIGS. 1A through 15.

FIGS. 1A and 1B show images of a WEC, manufactured by Ocean Power Technologies, which is an example of art prior to the present invention. FIG. 1C schematically illustrates how such a WEC operates. When WEC 100 is positioned to encounter a group of moving waves W, float 102 rises and falls along a spar 103 oriented with a predominantly vertical axis VV'. The spar is held in a relatively stationary position by the heave plate 105 at its bottom, since waves are surface phenomena and water at depths greater than one wavelength does not move up and down much. The bobbing up-and-down motion of the float 102 serves to drive some type of energy conversion mechanism (not shown, but present within WEC 100) that converts at least a portion of the kinetic energy of that motion into electrical energy, that may in turn be delivered to an ultimate load (not shown) and consumed. The energy conversion mechanism may include some type of hydraulic mechanism to enable kinetic to electrical conversion. In most cases, WEC 100 has to be tethered to a fixed mooring (not shown), limiting the distance range over which the load may be positioned and still receive power generated by WEC 100. The vertical dimension of WEC 100 is typically on the scale of—or larger than—the wavelengths of the waves which the converter is expected to encounter because the heave plate needs to lie below the region of wave motion for efficient WEC operation.

FIGS. 2A, 2B, 2C, 2D, 2E and 2F illustrate a WEC 200 according to one embodiment of the present invention in different deployment scenarios. WEC 200 is characterized by an axial length L along longitudinal axis AA'. It substantially floats on the surface of the water. When WEC 200 is positioned to encounter a group of moving waves W, WEC 200 is configured to tilt as shown, about a horizontal axis perpendicular to longitudinal axis AA'. The hollow circle labeled BB' (for consistency with AA') indicates (by the position of its implied center) the projection of the horizontal "tilt" axis on the plane of FIG. 2A (and of FIG. 2B), as this axis lies perpendicular to the plane of each of these figures. This tilting see-saw motion serves to drive a power generator (not shown but present within WEC 200) that converts at least a portion of the kinetic energy of that motion into electrical energy, that may in turn be delivered to the ultimate load (not shown) and consumed.

A WEC deployed in a body of water may often be expected to encounter waves with amplitudes spanning a large range, with wave period varying as well. Multiple families of waves may be present at once, with each family potentially having a different period and coming from a different direction. In this disclosure, the term "group of waves" refers to the plurality of waves in the vicinity of, and potentially interacting with, the WEC, while the term "dominant sub-group of waves" refers to a subset of that group characterized by the largest amplitudes, conversion of kinetic energy from that subset typically being responsible for the majority of the electrical energy provided by the WEC. The threshold over which waves may be considered to be of sufficiently large amplitude to fall into the dominant sub-group will clearly vary between different deployment scenarios and weather conditions, but in most cases, a reasonable estimate may be made. In the waters of San Francisco Bay, for example, the threshold may typically be about 0.5 meters, while offshore the threshold may often be about 1.0 meter. In an extreme case, such as a single swell offshore in the absence of wind waves, where waves are expected to be very uniform in amplitude, the "dominant sub-group" may be indistinguishable from the group as a whole.

Axial length L is deliberately chosen to be less than approximately one quarter of the average wavelength A expected to be encountered in a dominant sub-group of waves (based on amplitude as discussed above) within the group of waves, optimizing the efficiency with which the tilting motion results in generating electrical power, as will be described in more detail below. Thus, WECs of this type will typically be smaller when used with waves having shorter wavelengths, such as inside bays, and larger in bodies of water having longer wavelengths, such as in the case of swells in the open ocean. Smaller values of L, such as 2 m or below, also facilitate deployment, so that the WEC can be transported using an SUV and a common, small runabout boat, as opposed to a tractor trailer and specialized ship with a crane. WECs of this latter type optimized for large ocean swells will need to be significantly longer and require more-expensive equipment for launching. They will also typically generate significantly more power since the mass and vertical height drop will be larger.

The power generator is designed such that WEC 200 generates power even if WEC 200 is floating free of the bottom or any stationary mooring point. In other words, WEC 200 need not be tethered to the sea bed (the situation shown in FIG. 2A) or to any other solid object, but, in some embodiments, may move through large distances over the surface of a body of water (e.g. an ocean, a lake, a reservoir, etc.). It can travel in response to prevailing currents and tides that affect lateral motion of water within the body, and in response to winds and waves at the surface of the body.

Figure 2B:
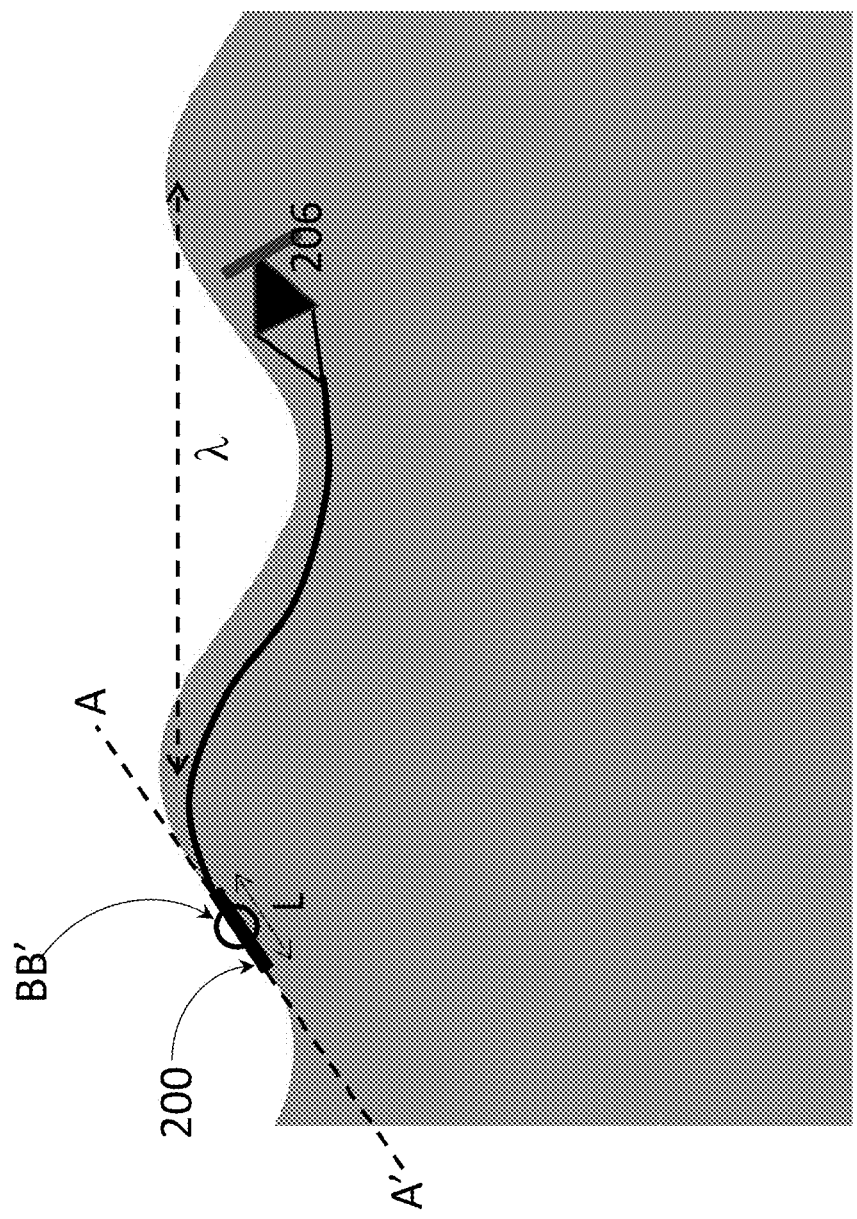
Figure 2C:
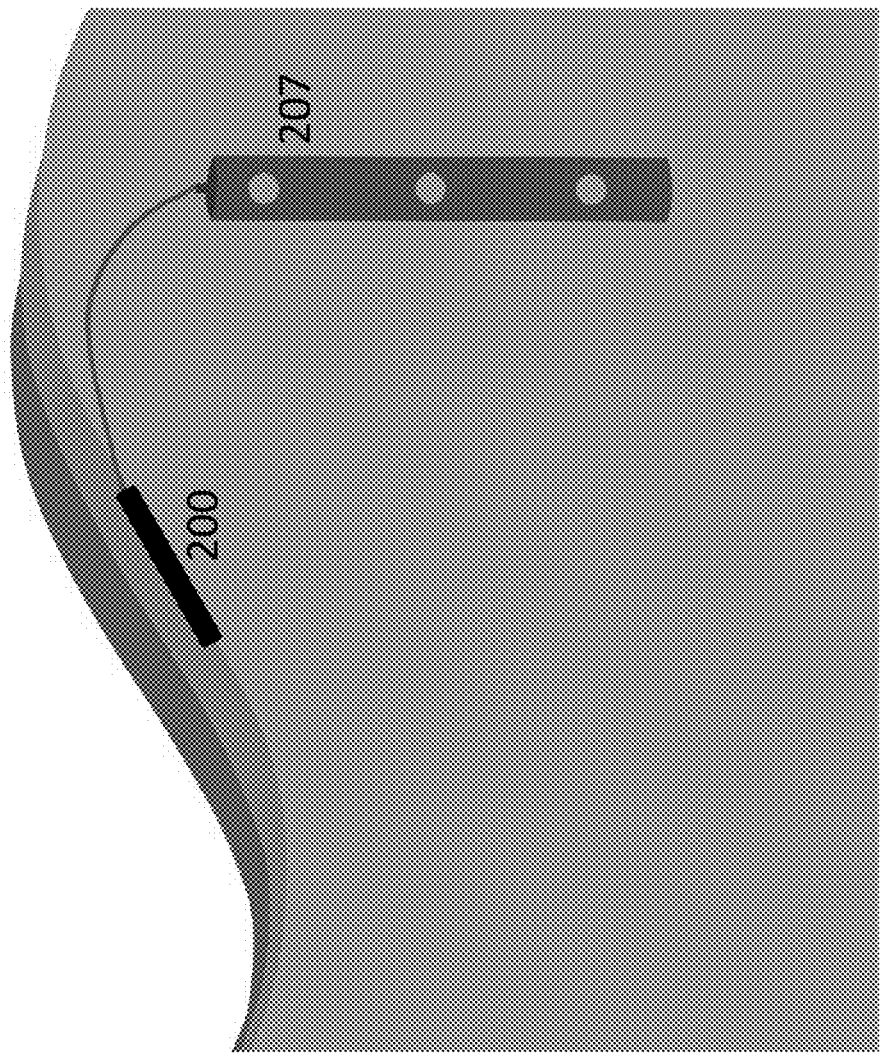
Figure 2D:
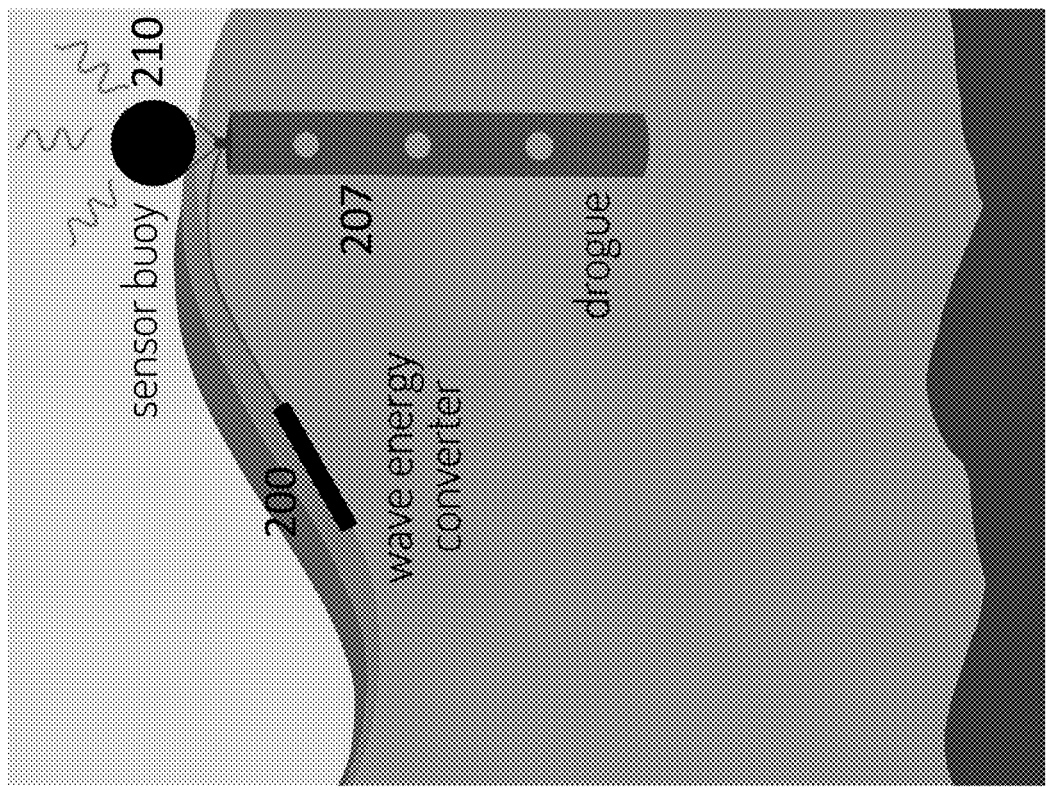

In practice, a WEC 200 for drift applications will likely be attached to some form of sea anchor 206 (as shown in FIG. 2B) or drogue 207 (as shown in FIGS. 2C and 2D). This attachment serves two purposes. First, the sea anchor or drogue helps the WEC 200 to align itself in drifting applications, keeping its longitudinal axis AA' largely perpendicular to oncoming wave fronts to maximize tilting motion and thus power generation. Second, the sea anchor or drogue will tend to follow water currents and tides, which will in turn typically provide a slower and longer path of travel in contrast to wind and waves simply pushing the WEC to shore.

Figure 2E:
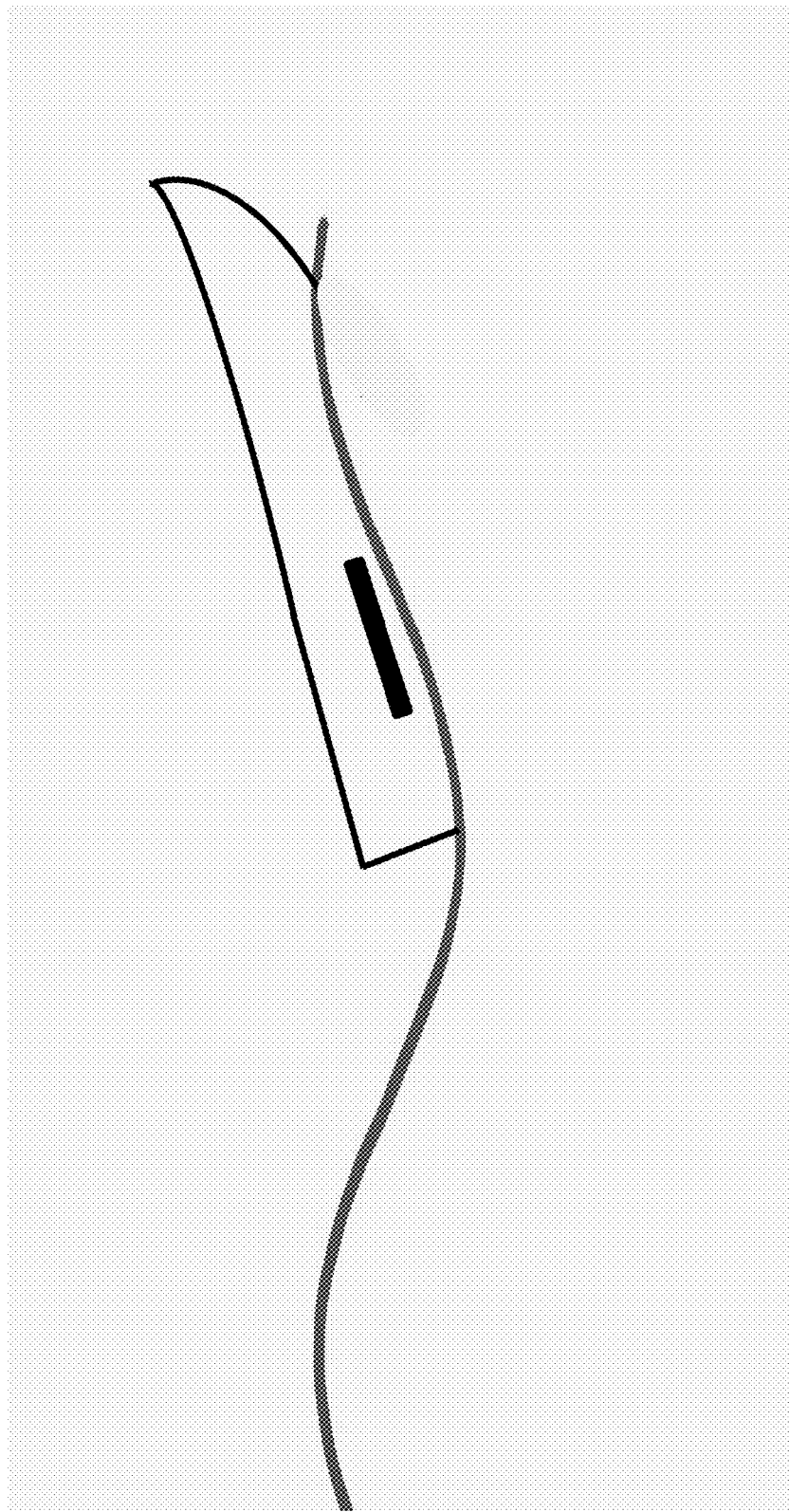
Figure 2F:
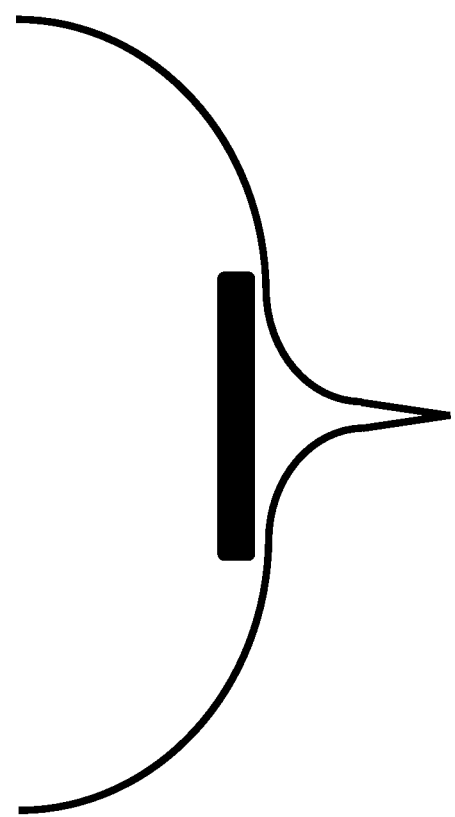

Additionally, the power generator in the WEC 200 can generate power even if the WEC 200 is not immersed in the water. The WEC 200 may be attached to some other object that tilts with wave motion such as a boat or a larger surface buoy. FIG. 2E shows a cross section of a boat hull with a WEC attached in the hull plane of symmetry so that when the boat pitches up and down as it speeds through waves, the WEC will tilt back and forth to generate power. FIG. 2F is a cross section of a boat hull showing another embodiment in which a WEC at a perpendicular orientation to the hull plane of symmetry captures energy from rolling motion.

In some embodiments, such as that shown in FIG. 2D, the load may be positioned within a device 210, such as a buoy, that floats on or near the top surface of the body of water, and that may also be connected to drogue 207. In other embodiments, not shown, the load may be attached to such a floating device. In some embodiments, the device containing or attached to the load may be located at any depth below the top surface of the body of water, down to the extreme case of being buried in the ground underlying the body of water. In yet other embodiments, the load may be within or attached to a device that is either at a fixed position or tethered to an object that is at a fixed position, for example a fish pen used in aquaculture. In yet other embodiments, the load, for example a sensor, may be integrated within the WEC housing itself.

In some embodiments, including those shown in FIGS. 2A-2D and 3, the WEC 200, 300 floats on or near a top surface of a body of water through which the group of waves moves, and is configured to self-orient with respect to the group of waves such that the longitudinal axis AA' of the WEC lies largely perpendicular to a primary axis BB' along which, or parallel to which, wave fronts WF of the group of waves (or of the dominant waves characterizing the group) are oriented. Passive methods to maintain orientation and tracking are well-known in the art of watercraft design. Standard seamanship also teaches the use of sea anchors and drogues to maintain orientation when a watercraft loses power. These methods can be applied to the WECs of the present invention and will not be discussed further herein.

For a WEC deployed in the water, a durable, fully-enclosing, watertight housing with floatation is needed to protect its inner workings. A WEC that is not immersed will not likely require its own floatation, and housing durability and water exclusion requirements may be less stringent depending on application.

Throughout this disclosure it should be understood that the word "horizontal" is intended to encompass orientations that may not be perfectly horizontal, instead deviating slightly, for example in situations with multiple wave systems, rough seas, etc.

Consider a group of waves including a dominant subgroup characterized by an average wave period. In some embodiments, the WEC comprises an electromagnetic power generator configured such that as the WEC tilts in response to wave motion, kinetic energy is converted to electrical energy through approximately one half of each average wave period. FIG. 4 shows a schematic illustration of this situation, where the wavelength is slightly longer than 4× the axial length of the WEC. When the WEC is tilted, a carriage 406 within the WEC moves "downhill" and kinetic energy is converted to electrical energy. When the WEC lies flat at the crest or trough of a wave, the carriage 406 holds still so no electrical power is generated.

In many embodiments of the present invention, as will be discussed in more detail below, the conversion of energy from the kinetic energy present in moving waves to the electrical energy delivered to a load occurs without using any intervening hydraulic element or mechanism. As noted above, this contrasts favorably with many systems and methods currently available for wave energy conversion.

Figure 5A:
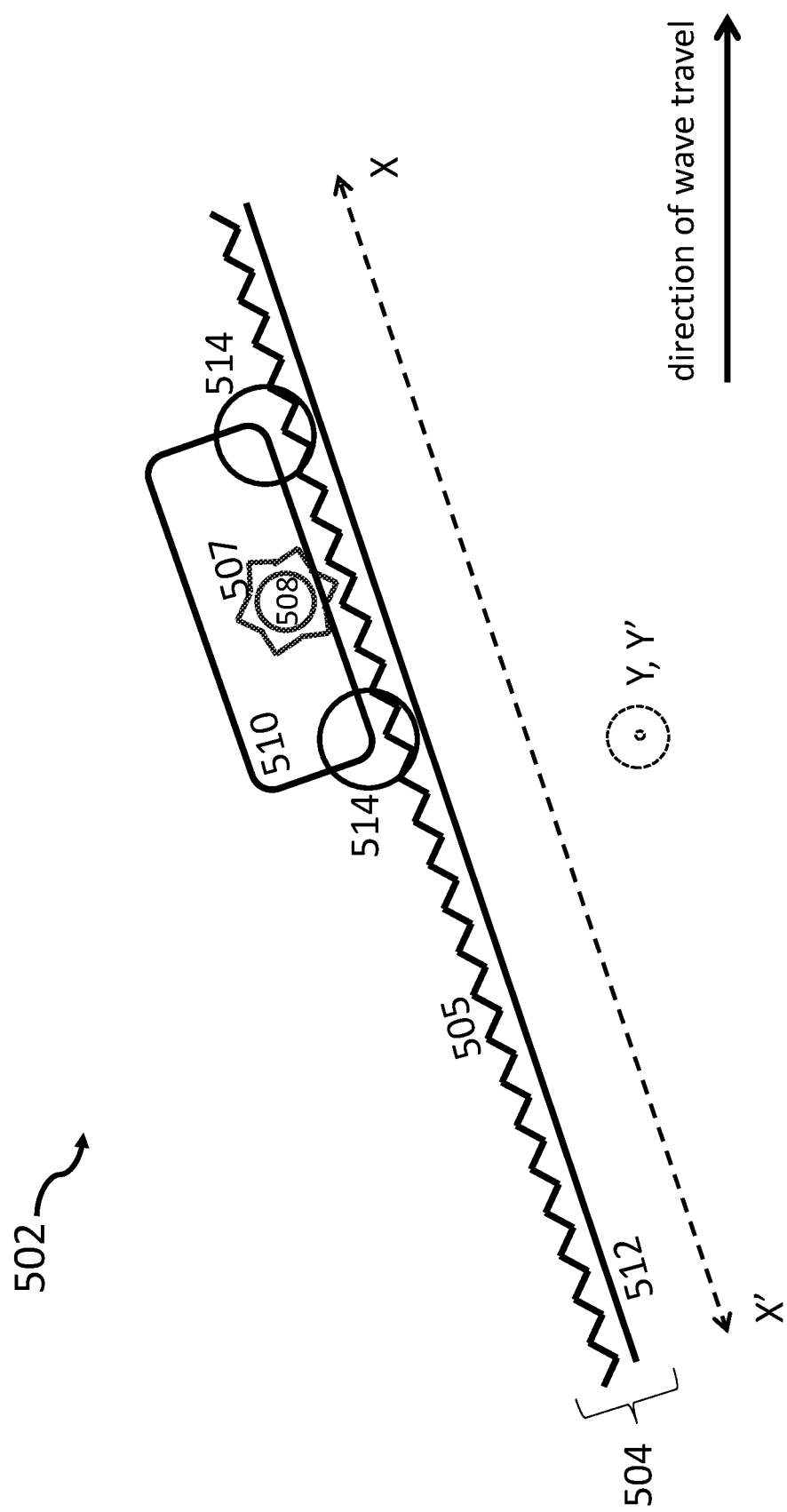
FIGS. 5A and 5B illustrate side and top views of a power generator within a WEC according to some embodiments of the present invention.
Figure 5B:
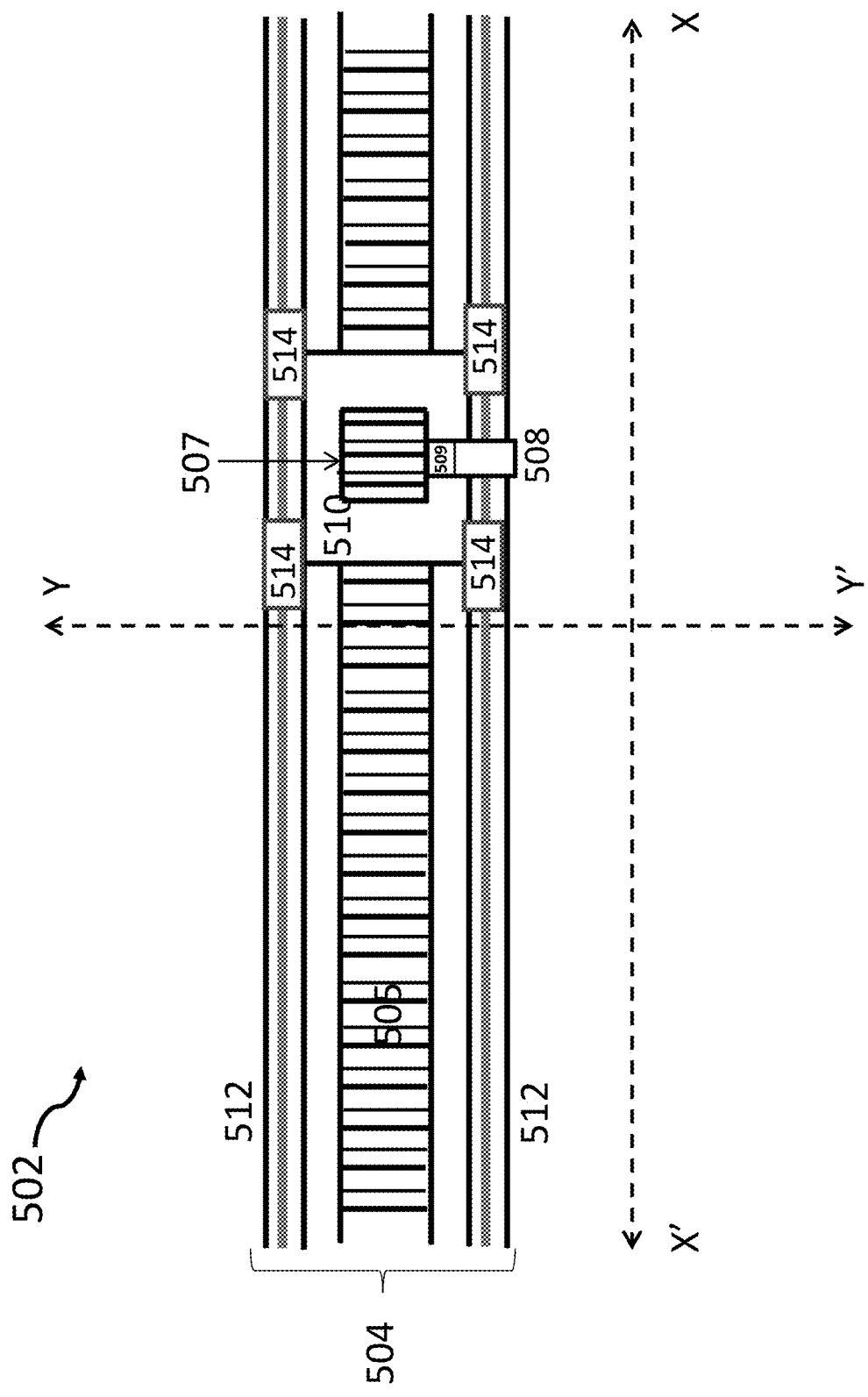
Figure 6A:
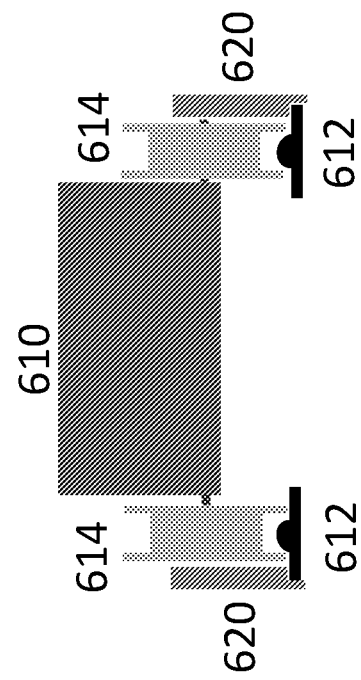
FIGS. 6A through 6D illustrate end views of barriers to prevent derailment of a carriage while moving within a power generator within a WEC according to some embodiments of the present invention.
Figure 6B:
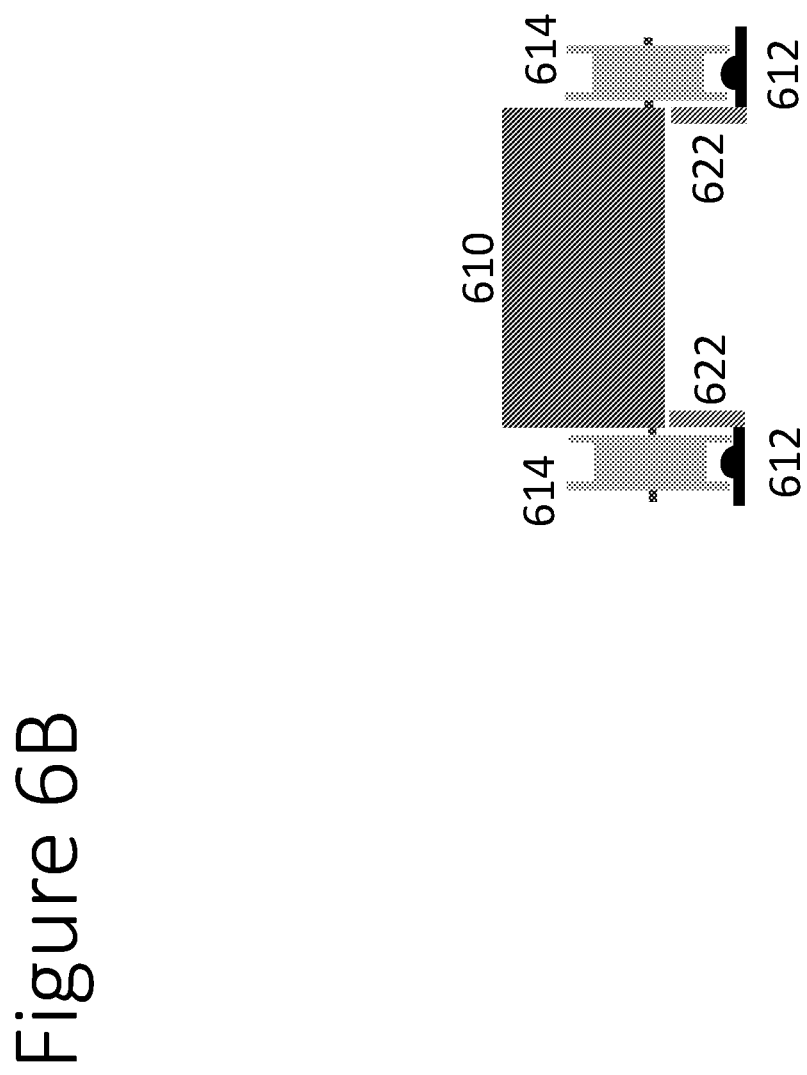
Figure 6C:
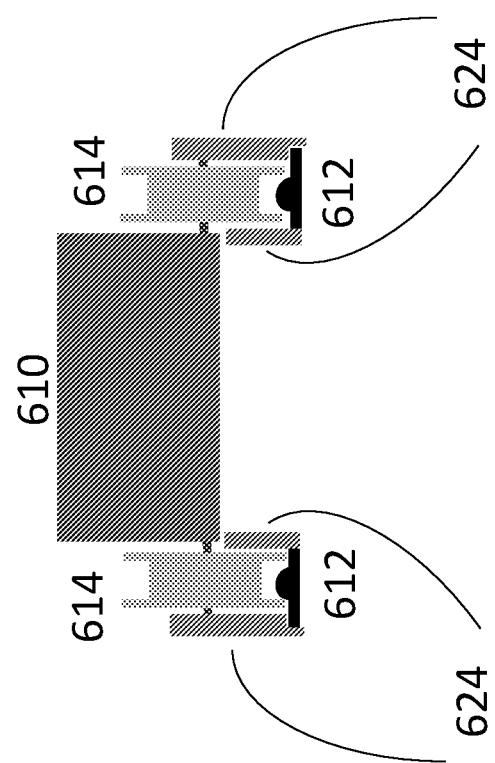
Figure 6D:
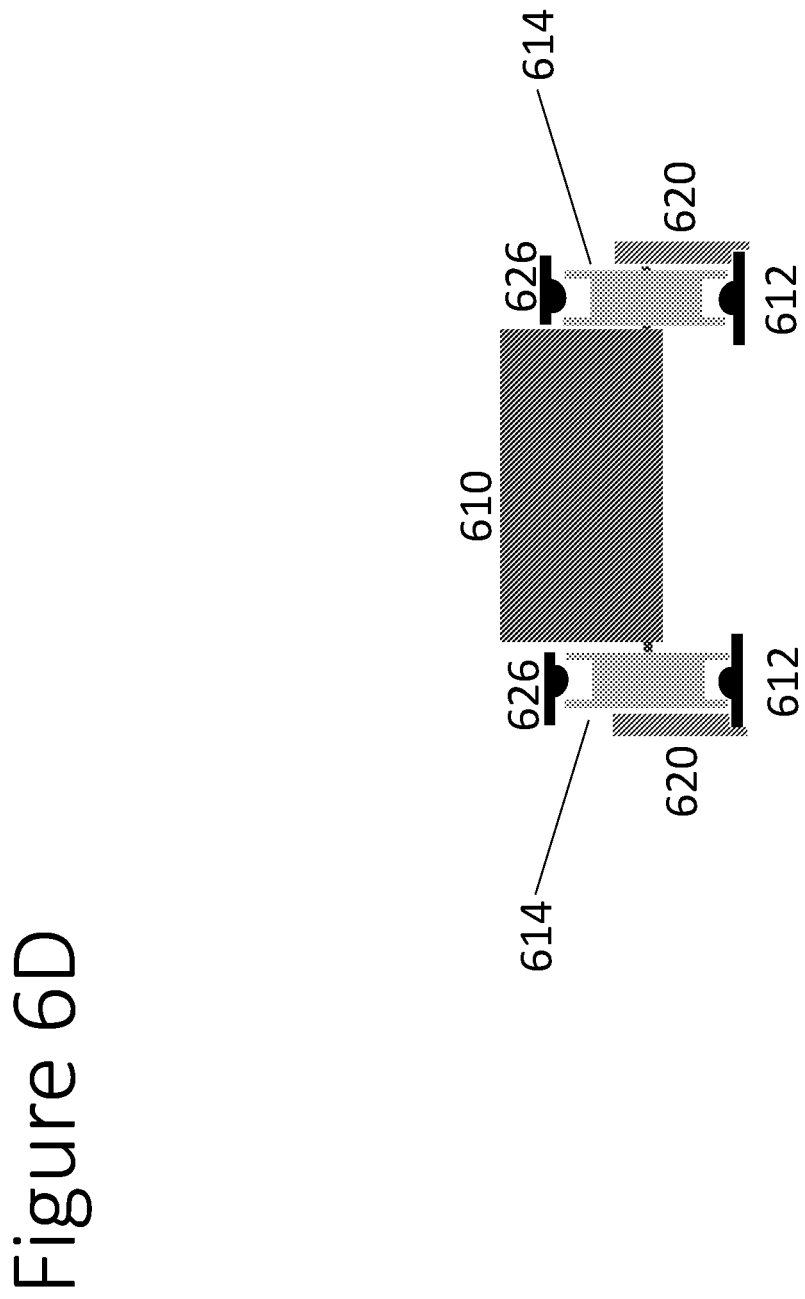

FIGS. 5A and 5B illustrate a power generator 502 within a WEC according to some embodiments of the present invention. Power generator 502 comprises a track 504 which includes a rack 505 of a rack and pinion mechanism, and auxiliary tracks 512. Auxiliary tracks 512 may be of the type commonly used with sliding doors ("sliding door tracks") but it should be appreciated that one or all of auxiliary tracks 512 may be of a type other than the sliding door type in other embodiments of the present invention, as long as the same function of confining motion of a carriage 510 along a desired path may be achieved.

Power generator 502 further comprises the carriage 510 containing a pinion 507, an electromagnetic generator 508, and wheels 514. The pinion 507 of the rack and pinion mechanism is coupled to electromagnetic generator 508 and is mounted in (or otherwise attached to) carriage 510. Alternatively, an electric motor run backwards can be used instead of electromagnetic generator 508. Through the remainder of this disclosure, including the claims, the term "electromagnetic generator" should be understood as encompassing the alternative possibility of an electric motor run backwards. Track 504 is oriented to lie parallel to the longitudinal axis XX' of power generator 502, which is aligned along or parallel to the longitudinal axis of the WEC. Sliding door tracks 512 are positioned near and coupled to rack 505, such that in response to the WEC (and therefore power generator 502) being tilted about a horizontal axis YY' perpendicular to the longitudinal axis XX', carriage 510 moves, with its weight supported by wheels 514 on sliding door tracks 512, along the longitudinal axis of track 504. The teeth of pinion 507 engage with the teeth of rack 505 to turn the pinion and thereby the shaft of the electromagnetic generator 508. Embodiments using sliding door wheels for wheels 514 will benefit from the very low friction resulting from ball bearings within these wheels. Maintaining low friction is important for achieving highly efficient operation of the power generator 502. Other types of low-friction wheels may also be employed.

In some embodiments, a gearbox 509 (see the top-down view, from above the plane of the track, shown in FIG. 5B) can be used between the pinion 507 and the electromagnetic generator 508. Variations in wave action, in conjunction with the fixed pitch (# teeth per unit length) of the rack and the number of teeth and diameter of the pinion, will determine a range of rotation rates of the pinion. The electromagnetic generator will operate most efficiently over only part of its rpm range. The gear box is selected to convert the rotation rate of the pinion to a rotation rate of the electromagnetic generator shaft that will lead to efficient electrical power generation. The purpose of gearbox 509, therefore, is to adjust the mechanical gear ratio in order to optimize the efficiency of the electromagnetic generator and thus increase power generation efficiency.

By virtue of the coupling between pinion 507, optional gearbox 509 and electromagnetic generator 508, the movement of carriage 510 down the tilted track 504 drives the generator to generate electrical power. As each passing wave is encountered, the tilt will occur first in one direction and then the opposite direction (first down to the left and then to the right in the case shown in FIG. 4) but appropriate electrical switching or rectification may readily be used to rectify the generated voltage waveform as necessary. Thus, the carriage may move to and fro with each wave's passage, causing power generation through significant portions of each wave cycle. As each wave trough or crest is encountered, of course, tilting is reduced to zero, generating no power, but significant power may be expected to be generated through approximately half of each wave period, as noted above. The electromagnetic motor located on the carriage adds mass to the carriage mechanism. However, yet more additional mass may be added to carriage 510 in order to increase the potential energy (mass×gravitational constant×height) and thus power generated for each transit of the carriage. Output of the electromagnetic generator can be delivered either by wires, which flex as the carriage moves, or by carbon brushes which reach to long contacts that run parallel to track 504. Other embodiments are also possible.

In order to prevent derailments, other track features can be employed. Barriers at the sides of the sliding door tracks 612 can prevent the carriage 610 from veering off the sides of the tracks, as shown in FIG. 6. The barriers may take the form of outer barriers 620 (FIG. 6A), inner barriers 622 (FIG. 6B) or dual-sided barriers 624 (FIG. 6C) adjacent to the wheels 614. In practice, L-shaped stock may be used to provide outer 620 or inner 622 barriers with the extra side running under sliding door track 612. Likewise, squared-off U-shaped stock may be used to provide dual-sided barriers 624 with the center section running under the sliding door track 612. In practice, mechanisms such as additional wheels can be added between the carriage and the barriers in order to reduce friction if the carriage 610 or its wheels 614 should contact the barrier. In order to prevent the carriage from jumping off the track vertically in the case of violent or confused seas, secondary (upper) tracks 626 can be mounted above the main tracks (FIG. 6D) but at a small distance away so that the wheels 614 do not touch them during normal operation. This spacing prevents friction from hindering motion of the carriage. (Rack, pinion and electromagnetic generator are not shown in FIGS. 6A through 6D.) Various combinations of these features may be used to keep the carriage on the tracks at all times for all possible WEC orientations. For example, if the WEC is turned upside down, the carriage can continue to run on secondary tracks 626.

Figure 7A:
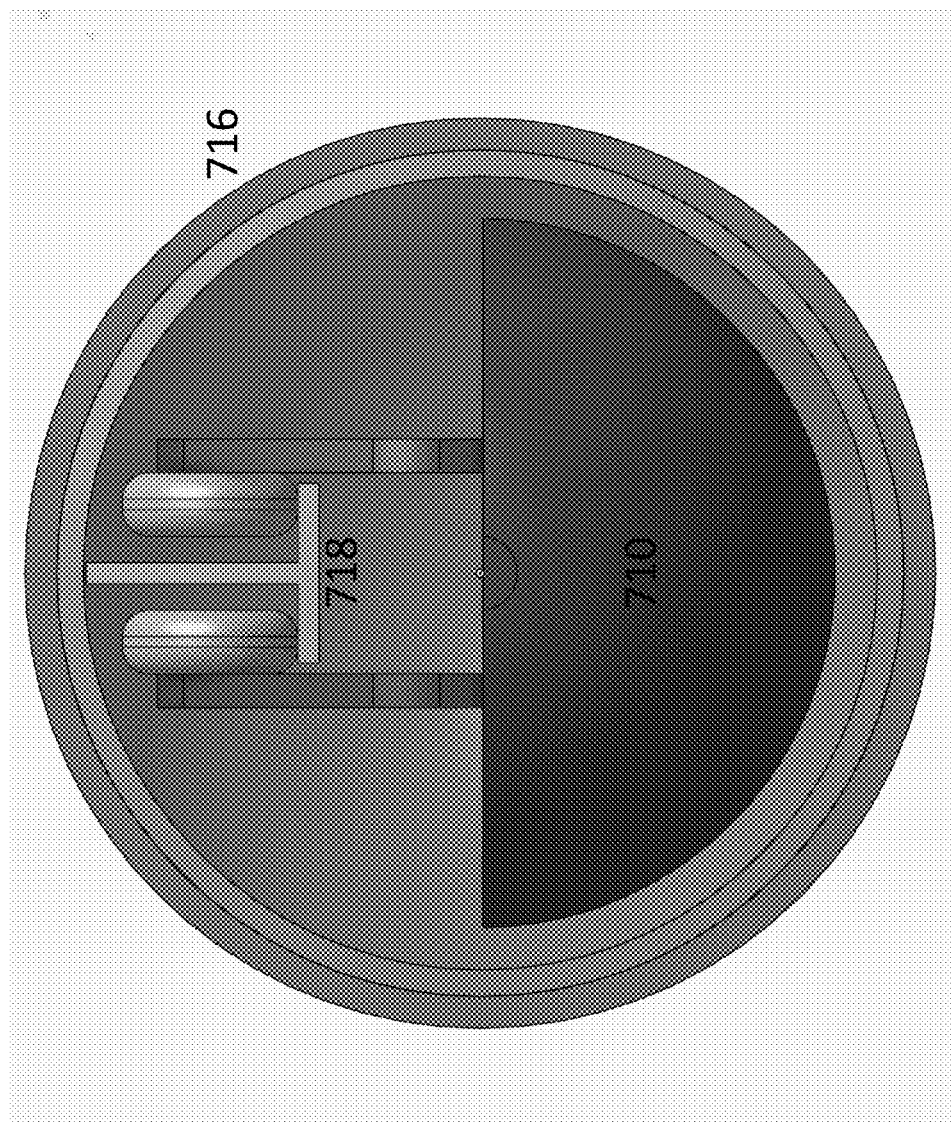
FIGS. 7A and 7B illustrate end and side views of a carriage moving within a power generator within a WEC according to some embodiments of the present invention.
Figure 7B:
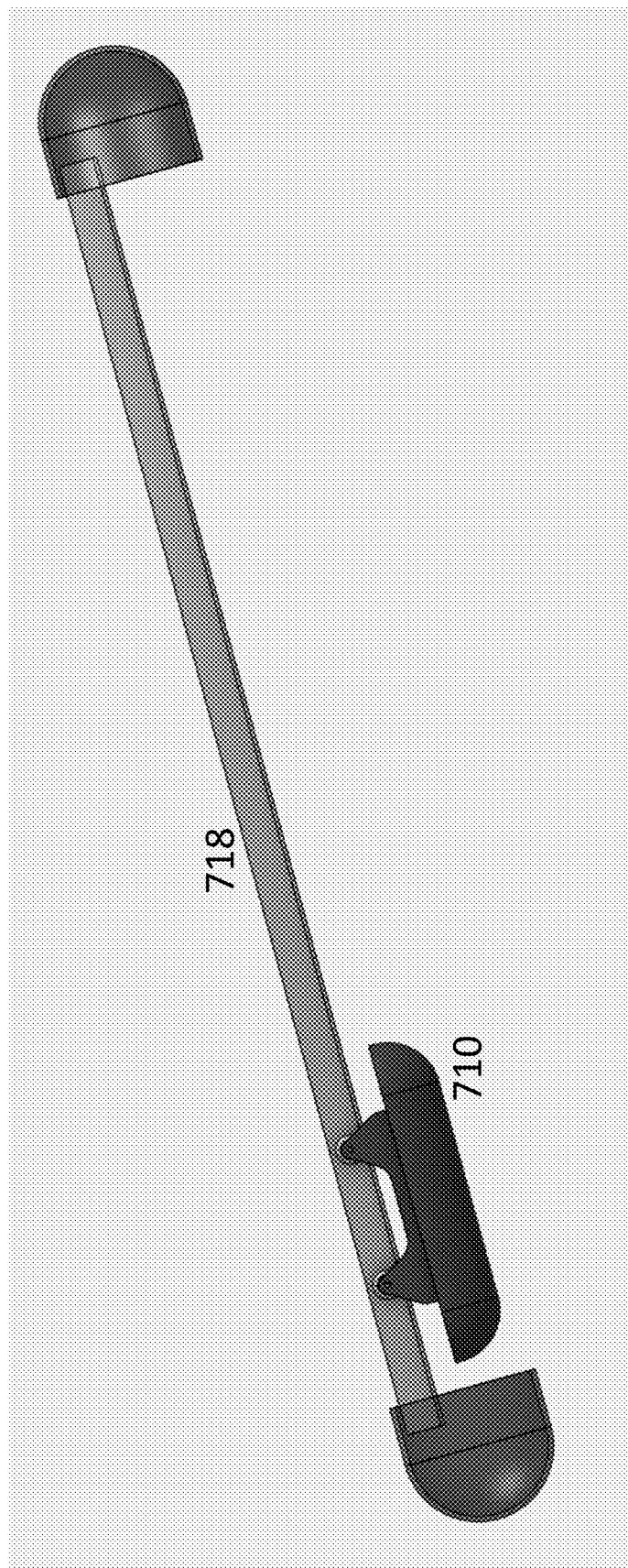

Different track configurations may be used as well. FIG. 7A shows an end view cross section of a hanging carriage 710 riding in a tube 716 below an inverted "T" track 718. The constrained area inside the tube helps to prevent derailment. Additional wheels can be used to reduce friction should the carriage touch the tube. FIG. 7B shows the entire carriage from the side, with most of the tube removed. (The rack, pinion and electromagnetic generator are not shown in FIGS. 7A and 7B.) In some embodiments, the tube may also serve as a waterproof housing. In yet another embodiment, the carriage may slide along rods, held by linear bearings.

In some embodiments, a mechanical transmission may be used to convert the alternating directions of travel into a single direction of rotation, thus eliminating the need for electrical rectification.

While embodiments including ball bearings in the wheels 514 offer the advantage of greatly reduced friction between the carriage and the track, thus improving the energy efficiency of the power generator, some embodiments may employ other mechanisms. In one such embodiment, a chain and sprocket combination typical of those used on a bicycle, is used to convert the kinetic energy of translation along the track into the kinetic energy of rotation. In other embodiments, belts and pulleys employing cogs or teeth are employed. Lines and pulley blocks are another alternative.

In embodiments such as those discussed above with respect to FIGS. 5A and 5B, an object sliding to and fro in response to wave-induced tilts is part of a mechanical train (including a rack and pinion mechanism) that is ultimately used to induce a voltage in the coil of an electromagnetic motor run backwards as a generator. Depending on the type of motor used, the electrical signal generated can be either AC or DC. In some embodiments, a second electromagnetic motor may be driven by the same pinion or by another pinion for purposes of mechanical symmetry and/or redundancy. In either case, i.e. one or two electromagnetic motor(s), either unipolar or bipolar outputs, e.g. +/−5 V, can be generated as required.

Figure 8:
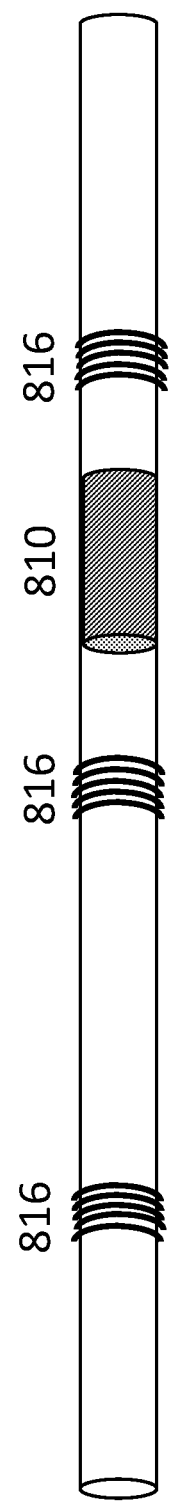
FIG. 8 shows an alternative embodiment of the present invention in which a magnet slides within conductive coils.

In other embodiments, the object sliding to and fro may itself comprise one or more permanent magnets, sliding within a series of surrounding coils in which an alternating voltage is then generated. No extra electromagnetic generator is required. In a simple configuration, the coil axis may be straight with the magnet(s) sliding along the linear coil axis as shown in FIG. 8. In other configurations, the coil path may be curved, with the magnet(s) following a correspondingly curved path therewithin. It may be calculated that such magnet-in-coil embodiments are characterized by a poor ratio of power generated per unit cost of critical parts, magnets and coils being expensive, and power being generated over a relatively small part of each wave cycle. Electromagnetic-motor based embodiments in contrast can generate power over a much greater fraction of each wave cycle, and may be shown to have a correspondingly better ratio of power per unit cost.

Figure 9A:
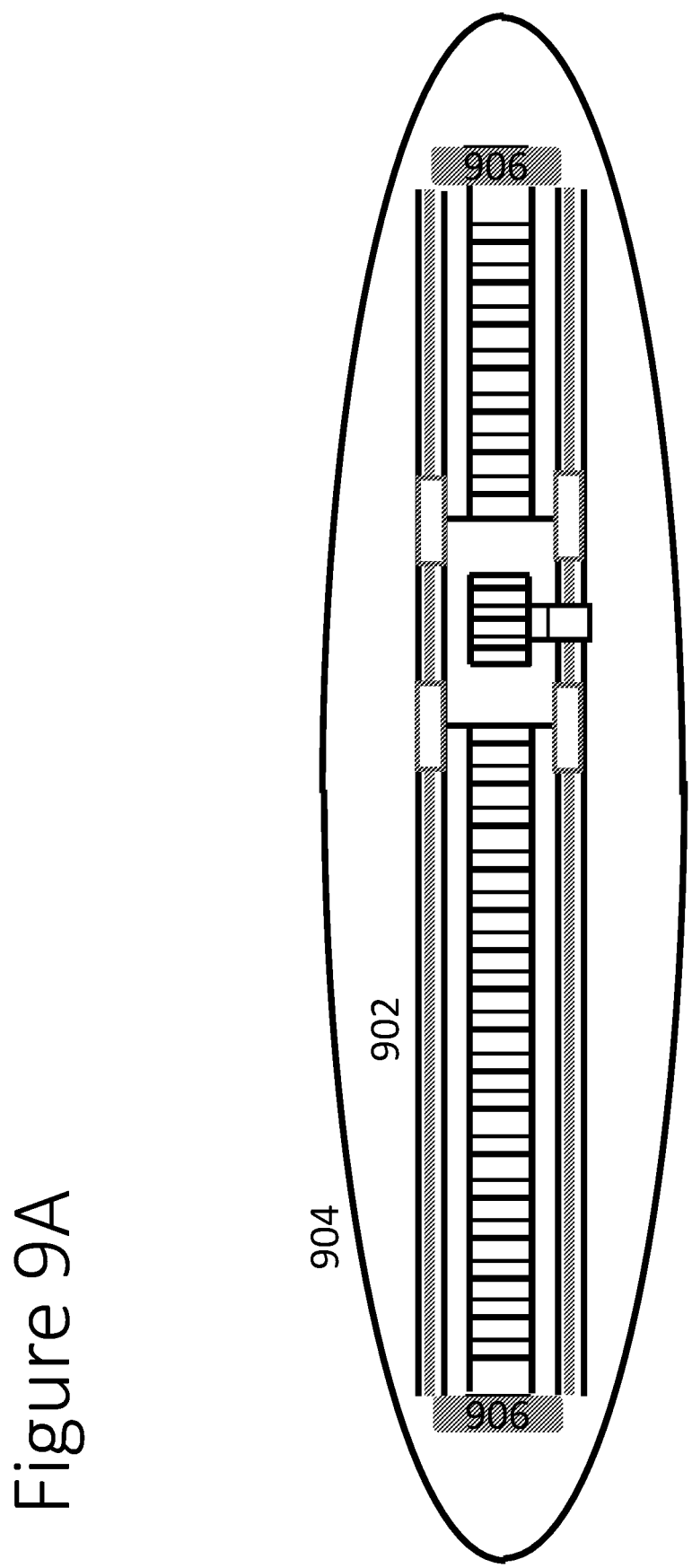
FIGS. 9A and 9B show top and side views of a power generator mounted inside a simple housing according to some embodiments of the present invention.
Figure 9B:
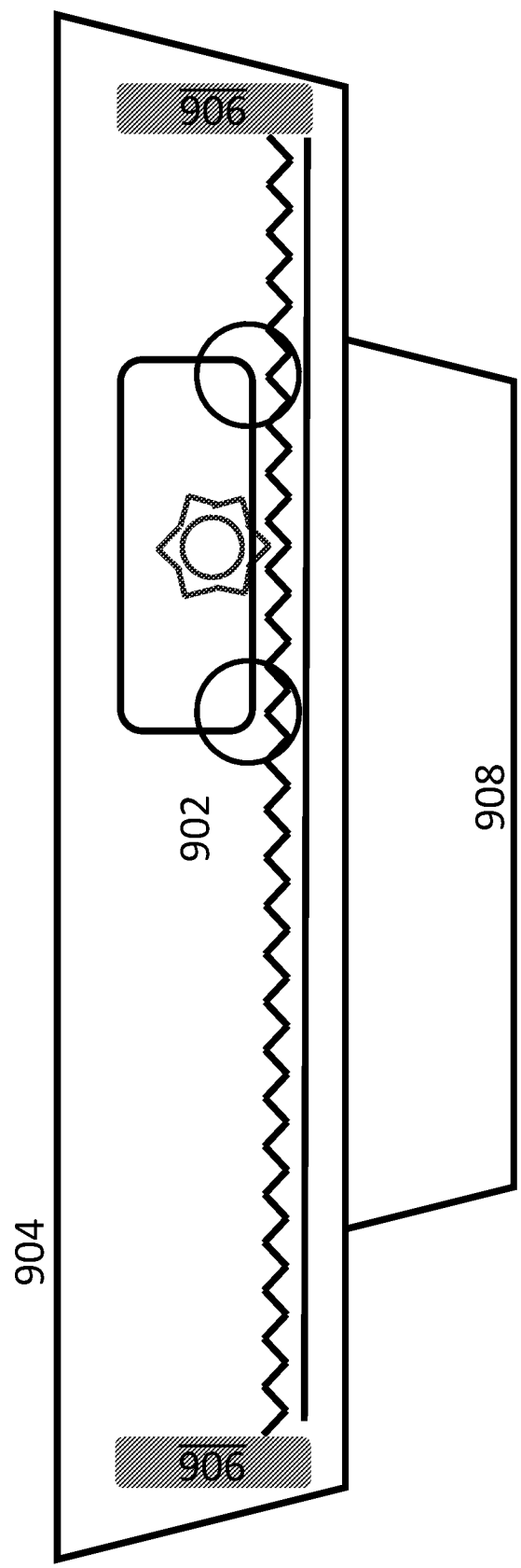

For various reasons, including the corrosive nature of seawater and the need for an insulating atmosphere around the electromagnetic motor, the power generator should be enclosed in a watertight housing such as that shown in FIGS. 9A and 9B. (The edges of the housing are shown, but otherwise the housing in the diagram is transparent in order to see the relationship between the power generator and the housing. In practice, the housing can be opaque.) The housing 904 also provides floatation to support the power generator 902 for all positions of the carriage. Its long dimension is aligned with the length of the track. A tether can be attached to one end in one embodiment, so that the system tends to automatically align perpendicular to the wave fronts. In the shown embodiment, keel 908 formed on the bottom will also aid alignment with respect to wave fronts and provide lateral stability. However, a keel may not be required in embodiments where the length of the housing along the X-X' direction exceeds the width of the housing in the Y-Y' direction (referring to FIG. 5B).

Bumpers 906 may be included within the housing so that the carriage does not crash into the housing in heavy seas. End-to-end hull symmetry (for example, like a canoe) with even application of floatation is desirable, but not required. This symmetry should keep the average hull pitch flat, compared to a boat shape that may cause one end to float higher than the other, when the carriage is centered. In other embodiments, the hull may be shaped differently, similar to the way boat hulls do not have identical shapes.

Bumpers are one way to dissipate excess carriage kinetic energy. Alternative means to slow the carriage include using springs in place of bumpers, curving the ends of the track upwards and varying the electrical load to slow down the carriage. The electrical approach has the additional advantage of increasing the amount of power that can be extracted from the WEC in heavy seas. Additionally, the load can be altered in gentle seas to reduce resistance to carriage movement so that power can be still be generated. Springs may increase power extraction compared to bumpers, because a spring can transfer some kinetic energy from one direction of carriage travel into kinetic energy in the opposite direction.

In some embodiments, a tether may be attached to the housing using a yoke extending to both sides of the housing, for example midway along the long dimension of the housing.

In seas with a long dominant wavelength $\lambda_d$, the upper limit on WEC length of $\lambda_d/4$ increases correspondingly. A longer, larger WEC can support a heavier mass in the carriage and thus potentially produce higher power than a small WEC can. If even higher powers are required, then WECs can be connected in arrays. For example, in some embodiments, a wave energy converter system may comprise a plurality of interconnected WECs of the types described above with respect to FIG. 2.

One embodiment of such a system is shown in FIG. 10. The power generated by such a system will be the sum of the powers generated by each of the WECs 1000, as adjacent WECs in a line collect power from adjacent portions of the wave fronts of the oncoming waves. In such a system, many WECs may be spread over a large area, collecting wave energy from a larger area of the water's surface than any single WEC of the array could. The axial length of each WEC is less than approximately one quarter of the average wavelength expected to be encountered in oncoming dominant waves. As in the single converter embodiments discussed above, the energy converter system will generate power independent of whether or not any of the WECs, interconnected by segments 1002, is tethered to any solid object at a position that is fixed independent of water motion. In order for the wave energy converter system to function efficiently, the mechanical connections between the individual WECs should allow the individual WECs to function efficiently as the wavelength of the water waves varies. For example, one row of WECs should not pull the next row of WECs towards a flat (horizontal) orientation, and those rows should not be able to crowd together so that the WECs collide with each other. If rigid connector segments between adjacent WECs or adjacent rows are unsuitable, then water-filled segments such as tubing, for example, may be used. In such cases, tubing segments 1002 are filled with a sufficient amount of water to keep them relatively stiff, but they will tend to float on the surface of the water rather than extending above or below. In this way, they will tend to let each WEC in a system perform more like a solo WEC.

In the embodiment illustrated in FIG. 10, there are relatively short interconnections between the WECs, tending to hold the WECs in similar orientations as viewed from above. This construction will encourage the WECs in the system to turn en masse in response to changes in the direction of the dominant group of waves.

In contrast, a different type of system of WECs can be built in which the individual WECs are separated by considerably larger distances, and each WEC is free to orient itself independently of neighboring WECs.

Figure 11B:
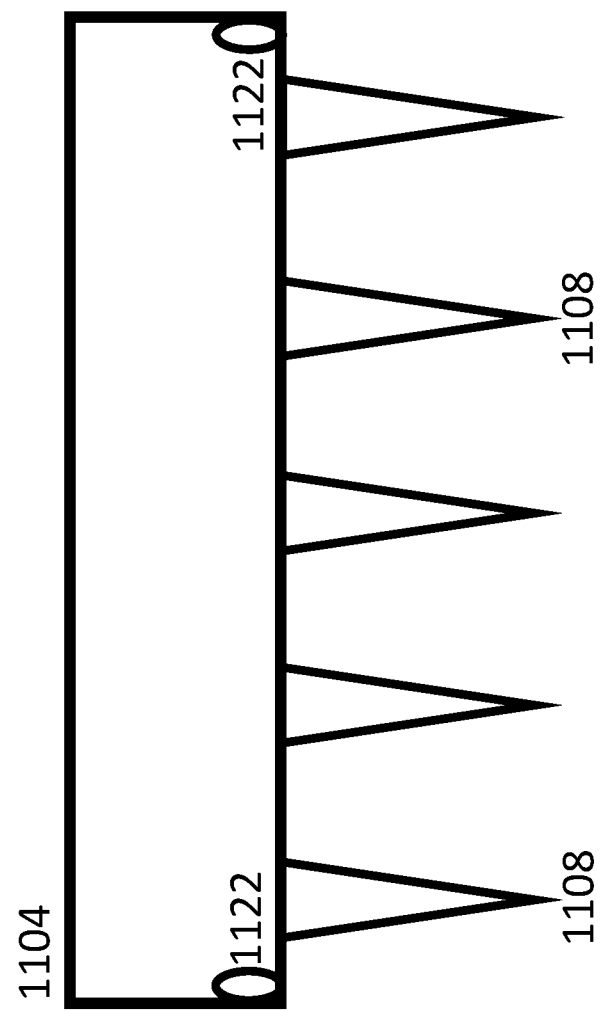

In some environments, a single wave system with all-parallel wave fronts is expected to dominate most of the time. In this case, the amount of energy collected by a single WEC can be increased by broadening the WEC in the YY' direction, as shown in FIGS. 11A and 11B. As viewed from the top in FIG. 11A, the WEC 1104 is broader than its length. With adequate flotation, this WEC's power generator can carry a heavier carriage and generate more power than a power generator of FIG. 5 (A and B) having the same length in the XX' direction or track length. Keeping a broad WEC pointed correctly into the wave fronts is more challenging as compared to a narrow WEC. Tethering with a yoke 1120 attached (for example at two points 1122) rather than at a single point may help, as also shown in the end view looking in the direction of wave travel, FIG. 11B. Multiple keels 1108 can be used as shown in the end view, FIG. 11B. In this figure, the housing is shown as opaque.

The motion of a small volume of water is actually circular as a wave goes by. The small volume of water moves in the direction of wave travel at its crest, then down, then in the opposite direction of the wave at its trough, then up. In another embodiment, the linear track 504 is replaced by a continuous oval track formed conceptually by curving one end the linear track up and over itself, then down to join the other end. Mechanisms to hold the carriage on the track such as dual-sided barriers (624) and secondary tracks (626) could prevent derailment. Under normal conditions, the carriage would travel back and forth along the lower section of track. Under heavy seas, the carriage could execute continuous travel all the way around the track. However, cost of parts for such a track would be quite high compared to a linear track. Since motion can be decomposed into three perpendicular directions, it may be more cost-effective to use mutually perpendicular linear tracks. In the case of the vertical track, a spring or other mechanism will probably be required to support the carriage at or near the middle of the track during periods of no wave activity.

Figure 12:
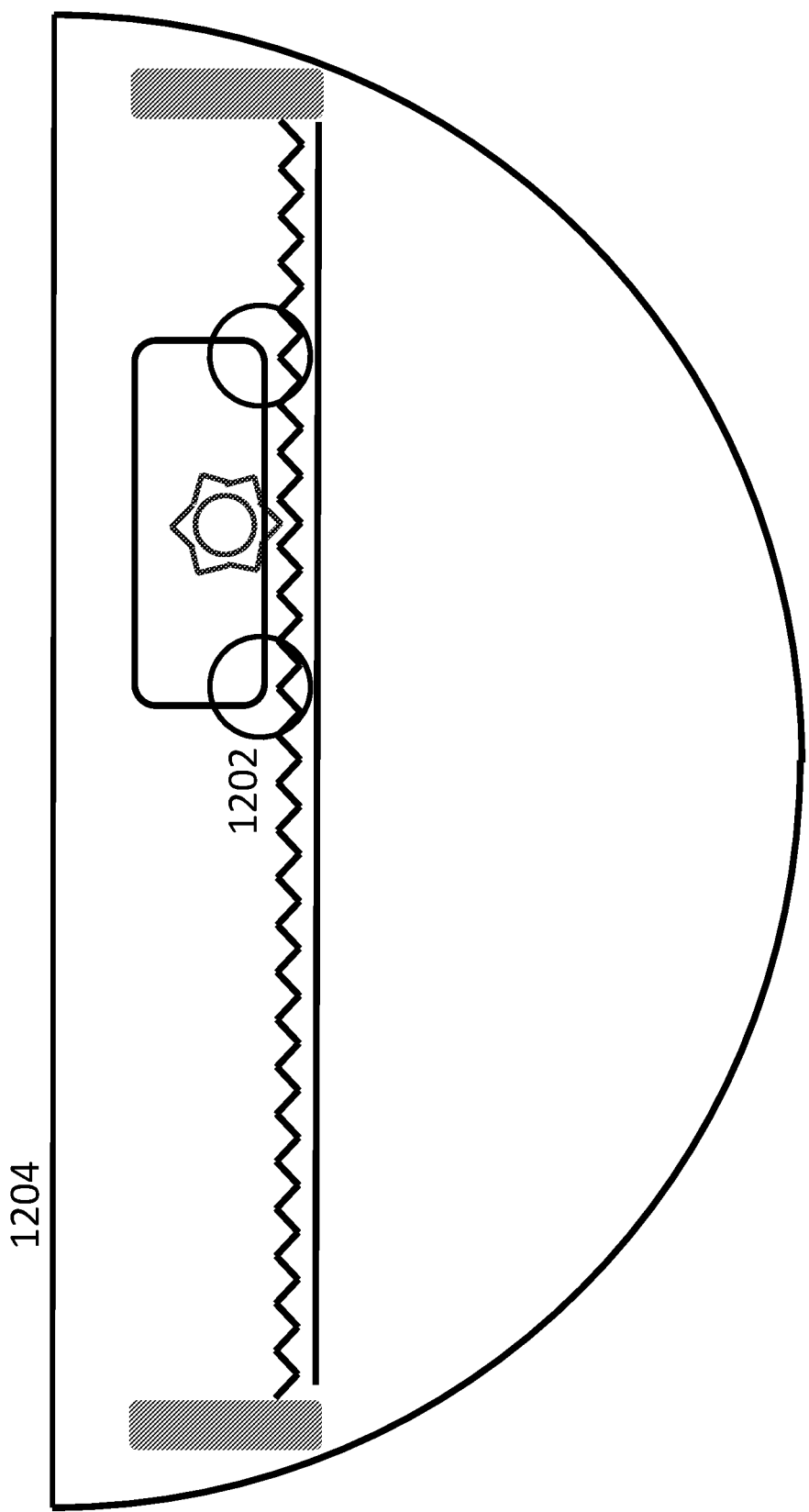
FIG. 12 shows a WEC comprising a power generator and a housing shaped according to one embodiment of the present invention.
Figure 13:
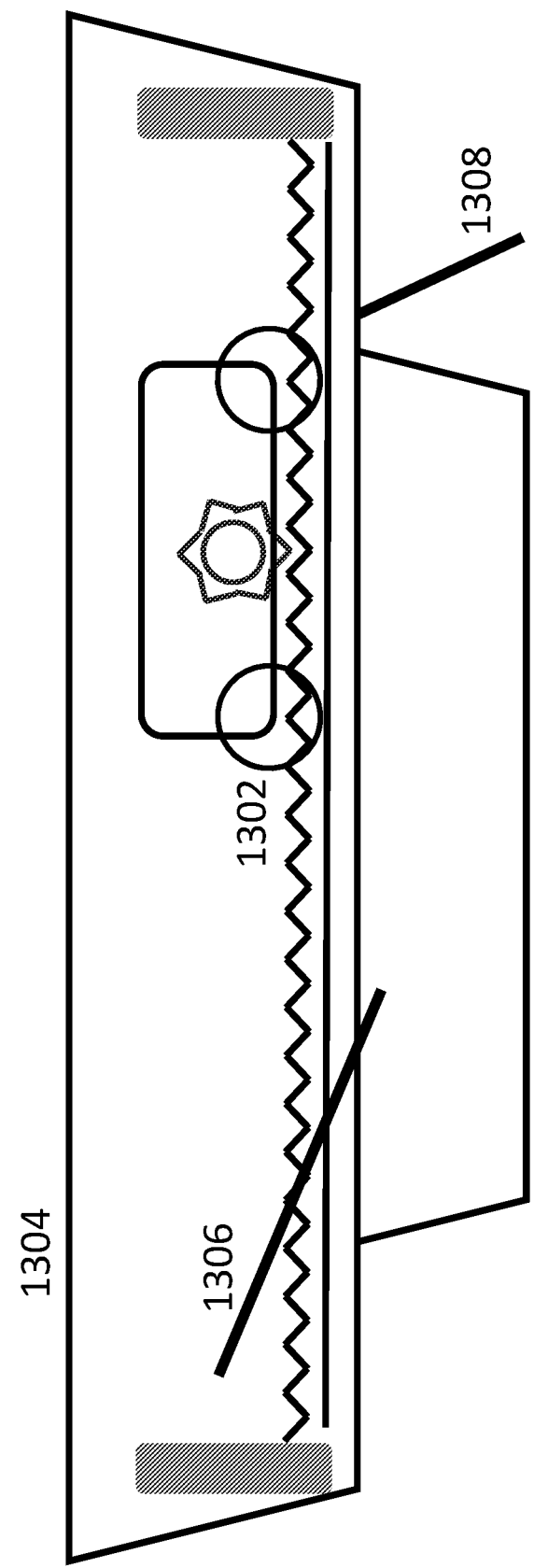
FIG. 13 shows a WEC comprising a power generator and a housing shaped according to another embodiment of the present invention.
Figure 14:
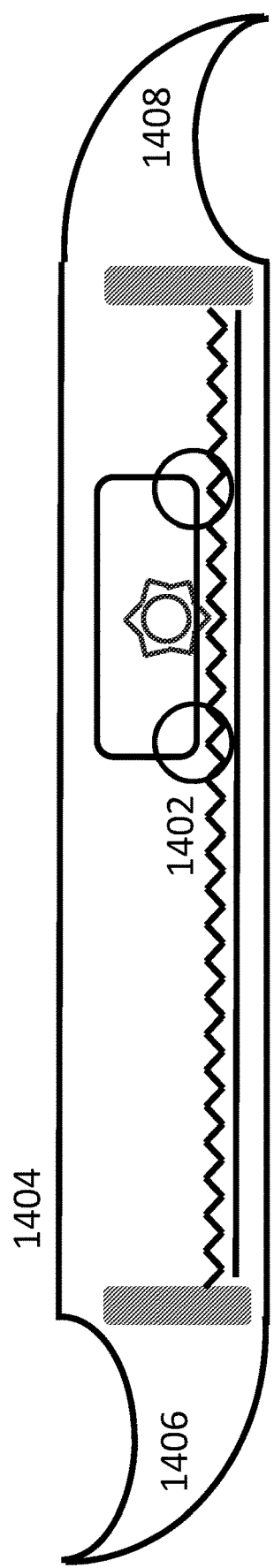
FIG. 14 shows a WEC comprising a power generator and a housing shaped according to yet another embodiment of the present invention.

Even with a singular linear track, it may be possible to better utilize the circular water motion to enhance the tilt and power output of the power generator through housing design. FIG. 12 shows one such embodiment, in which the bottom of the housing is round in order to increase rocking. FIG. 13 shows another embodiment with fins 1306 and 1308 extending out from housing 1304. Fins 1306 extend from both sides of the housing in directions away from the track of power generator 1302, somewhat like the pectoral fins of a fish. Fin 1308 extends from the housing at an angle downward from said track. This plane of this fin has a normal vector pointing at an angle between upward towards the sky and backwards (to the right) along axis XX'. This fin 1308 could be split into two symmetrical parts. More generally, fins 1306 and 1308 may be shaped and even curved to maximize WEC power generation efficiency. FIG. 14 shows yet another embodiment in which the housing ends 1406 and 1408 are shaped to enhance housing tilt. In other embodiments, housing shapes may vary in ways similar to the way that boat hull shapes vary.

Figure 15:
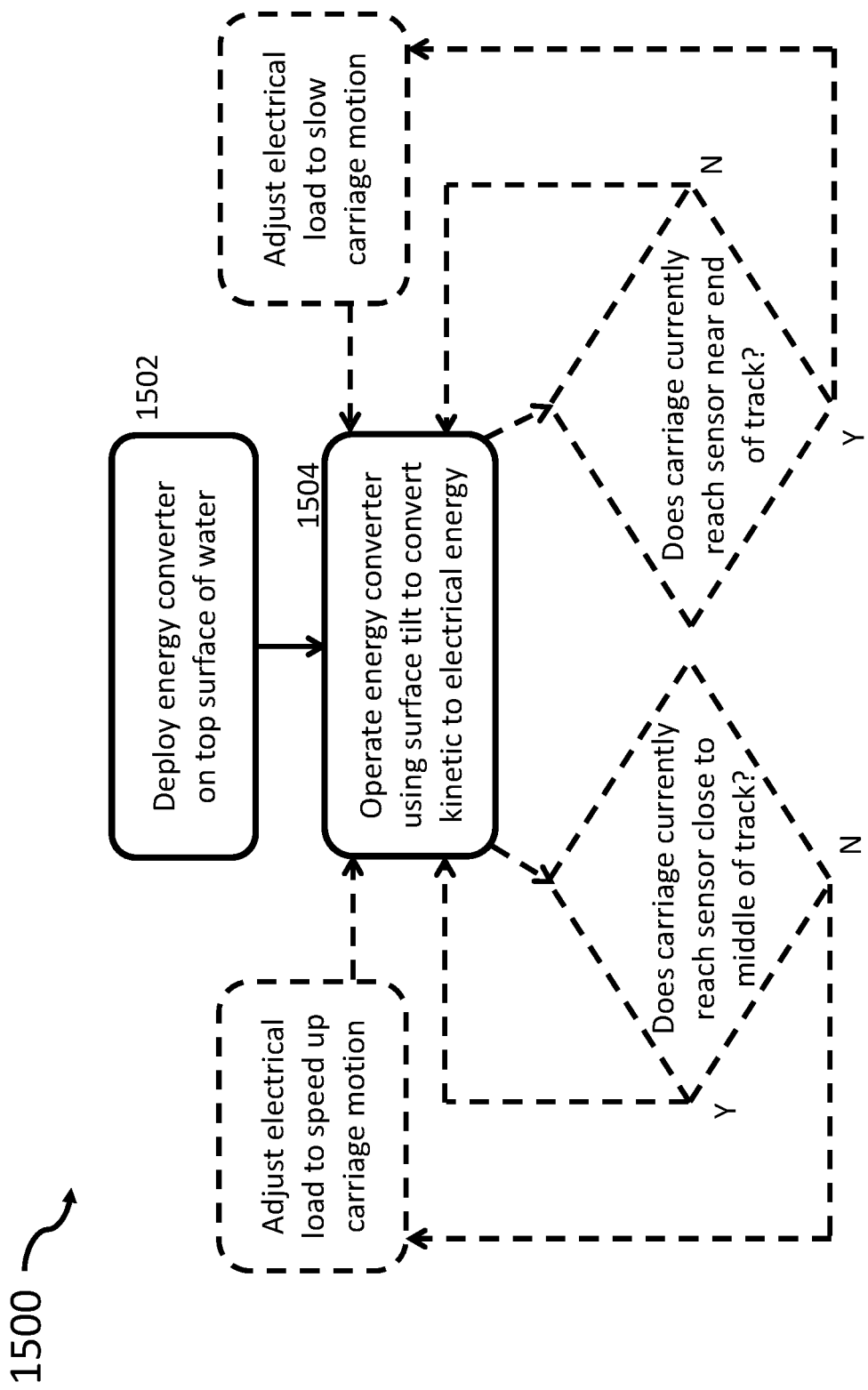
FIG. 15 is a flowchart of a method according to some embodiments of the present invention.

FIG. 15 is a flowchart of a method 1500 of wave energy conversion according to embodiments of the present invention. Steps 1502 and 1504, the steps of deploying a WEC on a top surface of a body on water (step 1502) and of operating the WEC to make use of tilt, imposed on the WEC by a group of waves moving through the body of water, to convert kinetic energy, present in a dominant sub-group of the group of waves, to electrical energy (step 1504) are common to all embodiments. The WEC in each embodiment is characterized by an axial length, along a longitudinal axis, less than approximately one quarter of the average wavelength expected to be encountered in a dominant sub-group of waves within the group of waves. The power generated by carrying out steps 1502 and 1504 of method 1500 is provided whether or not the WEC is tethered to any solid object at a position that is fixed independent of water motion.

The other steps shown with dashed lines and boxes in method 1500 may be present in an enhanced embodiment, in which the electrical load is adjusted to keep the power generator functioning efficiently over a wide variety of wave conditions. For example, in heavy seas, where the waves will be larger, the WEC will tilt more, and without any load adjustment the carriage will likely hit bumpers or springs at the ends of the track. The kinetic energy dissipated in the bumpers is wasted. Therefore, it would be more efficient to adjust the load so that the carriage moves more slowly and doesn't hit the bumpers. This adjustment can be made electrically or mechanically, with the electrical approach likely leading to less-expensive manufacture than the mechanical approach. In practice, sensors along the track can be used in control loops to set the load so that, on average, the carriage travels most of the length of the track during each wave period. The specific steps shown in the dashed—optional—portions of FIG. 15 indicate one approach that allows the load to be adjusted to increase the distance traveled if the carriage isn't moving far enough to cover a reasonably large fraction of the length of the track, and conversely to decrease the distance traveled if the carriage is reaching the end of the track. Other embodiments may include more position sensors, different types of sensors, or different algorithms, such as controlling load based on carriage speed rather than on carriage position.

The WEC can include one or more Micro-Electro-Mechanical Systems (MEMS) sensors to detect incline and acceleration. Sensor output(s) can be used to optimize the electrical load, as well as to characterize local wave motion.

Figure 3:
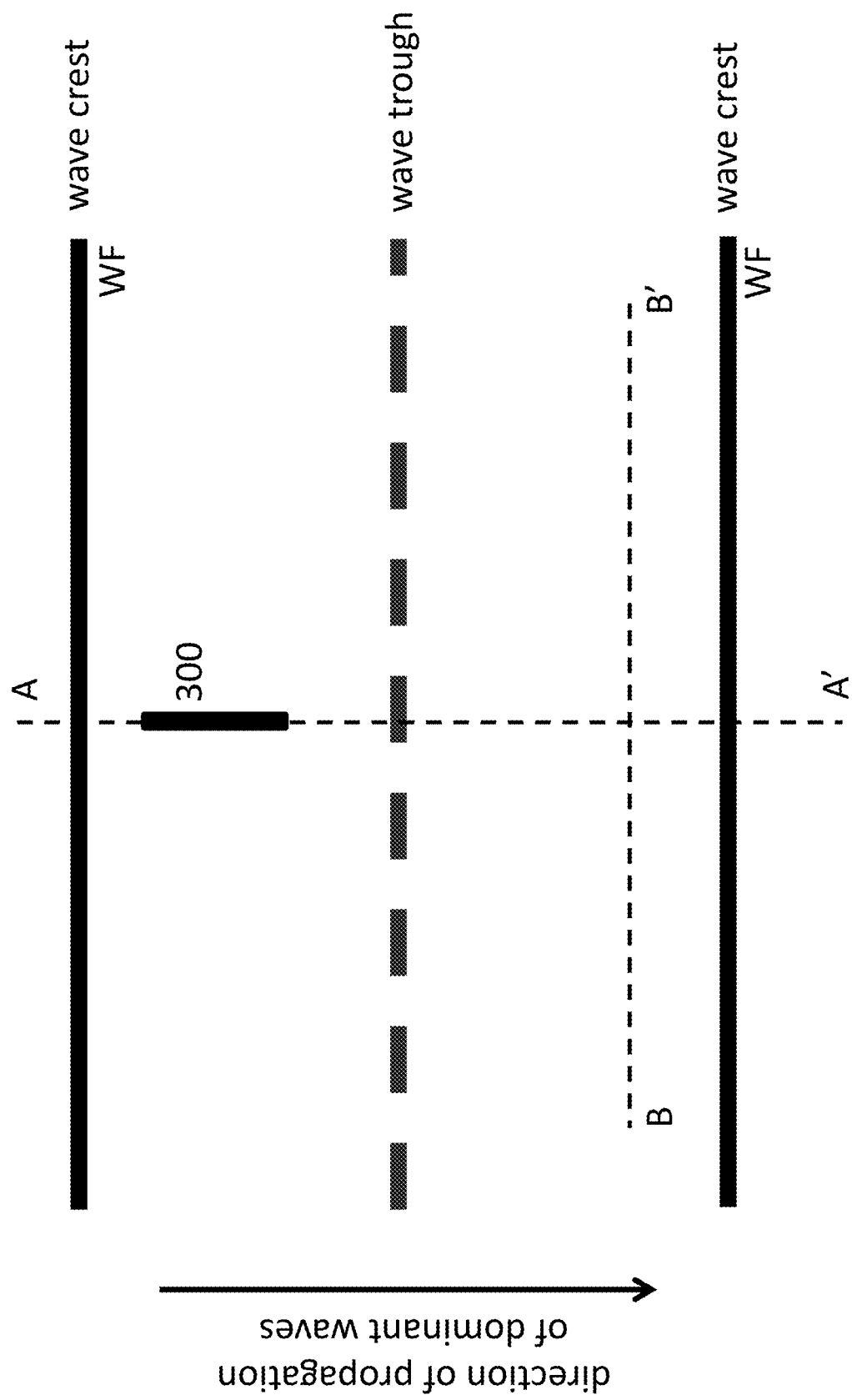
FIG. 3 illustrates a top down view of a deployed WEC according to one embodiment of the present invention.

As discussed above in terms of the structure and configuration of WECs according to the present invention, and illustrated in FIGS. 2 and 3, the WEC used in some embodiments of method 1500 floats on or near a top surface of a body of water through which the group of waves moves, wave fronts of the group being oriented along or parallel to a primary axis; and the WEC is configured to self-orient with respect to the group of waves such that the longitudinal axis of the WEC lies perpendicular to the primary axis.

In some embodiments of method 1500, at least part of the electrical energy generated is delivered to a load within, or attached to, a device that floats on or near the top surface of the body of water. In some of these embodiments, the load comprises at least one of an illumination system, a navigation system, a communication system, an imaging system, and a sensing system. The sensing system may be present within the WEC itself, or it may comprise one or more sensors external to the WEC. One particular application of the invention disclosed herein is the delivery of the generated electrical energy to a sensing system configured to monitor wave dynamics. In such a case, the waves of interest may very conveniently provide the energy that enables researchers to study features of those waves. The WEC might be particularly useful in studies carried out long distances from shore, where conventional monitoring systems may be difficult and/or expensive to power and maintain in an optimum operational state. It may also be particularly useful at high latitudes, where very little solar power can be collected during winter.

The present invention overcomes deficiencies and drawbacks of the prior art by employing a mechanism to harvest wave energy that does not require a fixed feature against which to react in order to produce power. The WEC is able to operate without the requirement of a fixed mooring and can generate power while being carried along the ocean surface. Unlike other WECs, this allows the current invention to readily operate as a power source for drifting buoys equipped with sensors for oceanographic sensing or many other applications. All the moving parts of the WEC are sealed inside a single housing, protecting against corrosion. Furthermore, the WEC described here can be much smaller and lower cost than other WECs. The WEC design and size permits transport by an SUV and deployment by hand from a runabout boat. It can operate in seas of any depth over approximately one meter.

Possible applications for the power generation provided by the present invention include, but are not limited to, the following:
  Aids to Navigation
  Other lighting (including LEDs such as UV LEDs to prevent biofouling and sterilize water)
  Communications (commonly radio frequency) buoys
  Sensors:
    Air temperature
    Water temperature
    Air pressure
    Water pressure
    Wind velocity
    Visibility (in air)
    Humidity
    Wave height
    Wave period
    Tidal height
    Salinity
    Turbidity
    pH
    Conductivity
    Dissolved oxygen
    Acceleration (which can also distinguish if the WEC is on ice vs. water)
    Video (e.g. to view fish in an aquaculture pen)

The embodiments described in this disclosure should be considered as illustrative examples of the present invention, rather than as limiting the scope of the invention. Various modifications of these embodiments will become apparent to those skilled in the art from the foregoing description and accompanying drawings.

The invention claimed is:

1. A wave energy converter comprising:
a power generator characterized by an axial length along a longitudinal axis, the axial length being greater than any other dimension characterizing the power generator along any axis perpendicular to the longitudinal axis;
wherein the power generator comprises a carriage configured to move linearly within the power generator, such that as the power generator is tilted, by an underlying group of water waves, about a horizontal axis which is perpendicular to the longitudinal axis and is perpendicular to a direction of motion of the group of water waves, the linear motion of the carriage in response to the tilt results in a conversion of kinetic energy, present in the group of water waves causing the tilt, to electrical energy;
wherein the axial length of the power generator is less than approximately one quarter of the average wavelength expected to be encountered in a dominant subgroup within the group of water waves; and
wherein the power generator generates power without requiring any mechanical connection to any object external to the power generator.

2. The wave energy converter of claim 1,
wherein the wave energy converter floats on or near a top surface of a body of water through which the group of waves moves, wave fronts of the group being oriented along or parallel to a primary axis; and
wherein the wave energy converter is configured to self-orient with respect to the group of waves such that the longitudinal axis of the power generator lies perpendicular to the primary axis.

3. The wave energy converter of claim 1,
wherein the wave energy converter floats on or near a top surface of a body of water through which the group of waves moves; and
wherein the power generator delivers at least part of the electrical energy to a load within, or attached to, a device that floats on or near the top surface of the body of water.

4. The wave energy converter of claim 1,
wherein the waves are characterized by an average wave period; and
wherein the power generator comprises:
an electromagnetic generator configured such that as the wave energy converter tilts in response to wave motion, kinetic energy is converted to electrical energy through approximately one half of each average wave period.

5. The wave energy converter of claim 1,
wherein the power generator comprises an electromagnetic generator including a gearbox.

6. The wave energy converter of claim 1,
wherein the power generator is configured to convert kinetic energy in the waves to electrical energy without involving any intervening hydraulic mechanism.

7. A wave energy converter comprising:
a power generator characterized by an axial length along a longitudinal axis, the power generator being configured to tilt about a horizontal axis perpendicular to the longitudinal axis, such that the tilt results in a conversion of kinetic energy, present in a group of water waves causing the tilt, to electrical energy;
wherein the axial length is less than approximately one quarter of the average wavelength expected to be encountered in a dominant sub-group of waves within the group of waves;
wherein the power generator generates power without requiring any mechanical connection to any object external to the power generator; and
wherein the power generator comprises:
 a pinion of a rack and pinion mechanism, the pinion being coupled to an electromagnetic generator and to a carriage;
 a track comprising a rack of the rack and pinion mechanism and auxiliary tracks positioned adjacent and parallel to the rack, the auxiliary tracks oriented to lie parallel to the longitudinal axis of the wave energy converter; and
 wheels coupled to the carriage, such that in response to the wave energy converter being tilted about a horizontal axis perpendicular to the longitudinal axis of the power generator, the carriage moves, supported by the wheels, along the auxiliary tracks.

8. The wave energy converter of claim 7,
wherein the track further comprises a barrier configured to confine and stabilize movement of the carriage on the auxiliary tracks.

9. A wave energy converter system comprising:
a plurality of interconnected wave energy converters;
wherein each of the interconnected wave energy converters comprises a power generator characterized by an axial length along a longitudinal axis, wherein the axial length is greater than any other dimension characterizing the power generator along any axis perpendicular to the longitudinal axis; and
wherein each of the power generator comprises a carriage configured to move linearly within the power generator, such that as the power generator is tilted, by an underlying group of water waves, about a horizontal axis which is perpendicular to the longitudinal axis and is perpendicular to a direction of motion of the group of water waves, the linear motion of the carriage in response to the tilt results in a conversion of kinetic energy, present in the group of water waves causing the tilt, to electrical energy;
wherein the axial length of each of the power generator is less than approximately one quarter of the average wavelength expected to be encountered in a corresponding dominant sub-group within the group of water waves; and wherein each of the power generator generates power without requiring any mechanical connection to any object external to that power generator.

10. The wave energy converter system of claim 9,
wherein each power generator is configured to convert kinetic energy in the waves to electrical energy without depending on any intervening hydraulic mechanism.

11. The wave energy converter system of claim 9,
wherein the group of waves causing one of the plurality of wave energy converters to tilt also causes each of the remaining ones of the plurality of wave energy converters to tilt;
wherein the plurality of interconnected wave energy converters float on or near a top surface of a body of water through which the group of waves moves, wave fronts of the group being oriented along or parallel to a primary axis; and
wherein the plurality of wave energy converters self-orient en masse with respect to the group of waves such that the longitudinal axis of each of the power generators lies perpendicular to the primary axis.

12. The wave energy converter system of claim 9,
wherein for each wave energy converter, the group of waves causing that energy converter to tilt is a local group of waves, wave fronts of the local group being oriented along or parallel to a primary axis; and
wherein each wave energy converter is configured to self-orient with respect to the corresponding local group of waves such that the longitudinal axis of the corresponding power generator lies perpendicular to the corresponding primary axis.

13. The wave energy converter system of claim 9,
wherein interconnections between adjacent wave energy converters comprise water-filled segments.

14. A method of wave energy conversion, the method comprising:
deploying, on a top surface of a body of water, a wave energy converter comprising a power generator, characterized by an axial length along a longitudinal axis, wherein the axial length is greater than any other dimension characterizing the power generator along any axis perpendicular to the longitudinal axis, and wherein the power generator comprises a carriage configured to move linearly within the power generator; and
operating the power generator such that as the power generator is tilted, by an underlying group of water waves, about a horizontal axis which is perpendicular to the longitudinal axis and is perpendicular to a direction of motion of the group of water waves, the linear motion of the carriage in response to the tilt results in a conversion of kinetic energy, present in the group of waves, to electrical energy;
wherein the axial length of the power generator is less than approximately one quarter of the average wavelength expected to be encountered in a dominant sub-group within the group of water waves; and
wherein power is generated by the power generator without requiring any mechanical connection to any object external to the power generator.

15. The method of claim 14,
wherein the wave energy converter floats on or near a top surface of a body of water through which the group of waves moves, wave fronts of the group being oriented along or parallel to a primary axis; and
wherein the wave energy converter is configured to self-orient with respect to the group of waves such that the longitudinal axis of the power generator lies perpendicular to the primary axis.

16. The method of claim 14 additionally comprising:
delivering at least part of the electrical energy to a load within, or attached to, a device that floats on or near the top surface of the body of water.

17. The method of claim 16,
wherein the load comprises at least one of an illumination system, a navigation system, and a sensing system.

18. The method of claim 17,
wherein the load comprises a sensing system configured to monitor wave dynamics.

19. A method of wave energy conversion, the method comprising:
deploying a wave energy converter comprising a power generator, characterized by an axial length along a longitudinal axis, on a top surface of a body of water; and
operating the power generator to make use of tilt, imposed on the wave energy converter by a group of waves moving through the body of water, to convert kinetic energy, present in the group of waves, to electrical energy;
wherein the axial length is less than approximately one quarter of the average wavelength expected to be encountered in a dominant sub-group of waves within the group of waves;
wherein the power generator generates power without requiring any mechanical connection to any object external to the power generator; and
wherein the power generator comprises:
a pinion of a rack and pinion mechanism, the pinion being coupled to an electromagnetic generator and to a carriage;
a track comprising a rack of the rack and pinion mechanism and auxiliary tracks positioned adjacent and parallel to the rack, the auxiliary tracks oriented to lie parallel to the longitudinal axis of the wave energy converter; and
wheels coupled to the carriage, such that in response to the wave energy converter being tilted about a horizontal axis perpendicular to the longitudinal axis of the power generator, the carriage moves, supported by the wheels, along the auxiliary tracks.

20. The method of claim 19,
wherein the power generator further comprises:
an electromagnetic generator coupled to a load of adjustable electrical resistance by an electrical pick up; and
wherein operating the power generator comprises adjusting the adjustable electrical resistance of the load in response to characteristics of the group of waves, such that a range of motion of the carriage along the longitudinal axis of the power generator is optimized.

* * * * *